(12) United States Patent
Zhou

(10) Patent No.: US 11,941,753 B2
(45) Date of Patent: Mar. 26, 2024

(54) FACE POSE ESTIMATION/THREE-DIMENSIONAL FACE RECONSTRUCTION METHOD, APPARATUS, AND ELECTRONIC DEVICE

(71) Applicant: ALIBABA GROUP HOLDING LIMITED, Grand Cayman Islands (KY)

(72) Inventor: Shiwei Zhou, Hangzhou (CN)

(73) Assignee: ALIBABA GROUP HOLDING LIMITED, George Town (KY)

( * ) Notice: Subject to any disclaimer, the term of this patent is extended or adjusted under 35 U.S.C. 154(b) by 0 days.

(21) Appl. No.: 17/186,593

(22) Filed: Feb. 26, 2021

(65) Prior Publication Data

US 2021/0183141 A1 Jun. 17, 2021

Related U.S. Application Data

(63) Continuation of application No. PCT/CN2019/101715, filed on Aug. 21, 2019.

(30) Foreign Application Priority Data

Aug. 27, 2018 (CN) .......................... 201810983040.0

(51) Int. Cl.
*G06T 17/00* (2006.01)
*G06T 3/00* (2006.01)
(Continued)

(52) U.S. Cl.
CPC ............ *G06T 17/00* (2013.01); *G06T 3/0031* (2013.01); *G06T 7/73* (2017.01); *G06V 40/174* (2022.01);
(Continued)

(58) Field of Classification Search
None
See application file for complete search history.

(56) References Cited

U.S. PATENT DOCUMENTS

| 6,959,109 B2 | 10/2005 | Moustafa |
| 7,212,664 B2 | 5/2007 | Lee et al. |

(Continued)

FOREIGN PATENT DOCUMENTS

| CN | 101404091 A | 4/2009 |
| CN | 102156537 A | 8/2011 |

(Continued)

OTHER PUBLICATIONS

Liu, Feng, et al. "Joint face alignment and 3d face reconstruction." European Conference on Computer Vision. Springer, Cham, 2016 (Year: 2016).*

(Continued)

*Primary Examiner* — Sarah Le

(57) ABSTRACT

This application discloses methods, apparatus, and electronic devices for face pose estimation and three-dimensional face reconstruction. The face pose estimation method comprises: acquiring a two-dimensional face image for processing, constructing a three-dimensional face model corresponding to the two-dimensional face image, and determining a face pose of the two-dimensional face image based on face feature points of the three-dimensional face model and face feature points of the two-dimensional face image. With this approach, the face pose estimation is performed based on the three-dimensional face model corresponding to the two-dimensional face image, instead of only based on a three-dimensional average face model. As a result, a high accuracy pose estimation can be obtained even for a face (Continued)

with large-angle and exaggerated facial expressions. Thus, robustness of the pose estimation can be effectively improved.

13 Claims, 12 Drawing Sheets

(51) Int. Cl.
*G06T 7/73* (2017.01)
*G06V 40/16* (2022.01)

(52) U.S. Cl.
CPC ............... *G06T 2200/08* (2013.01); *G06T 2207/30201* (2013.01)

(56) References Cited

U.S. PATENT DOCUMENTS

| | | | |
|---|---|---|---|
| 7,426,292 | B2 | 9/2008 | Moghaddam et al. |
| 7,756,325 | B2 | 7/2010 | Vetter et al. |
| 7,804,997 | B2 | 9/2010 | Geng et al. |
| 7,835,568 | B2 | 11/2010 | Park et al. |
| 9,552,668 | B2 | 1/2017 | Yang et al. |
| 9,679,192 | B2 | 6/2017 | Luo et al. |
| 9,936,165 | B2 | 4/2018 | Li et al. |
| 10,286,173 | B2 | 5/2019 | Davis |
| 2006/0269143 | A1 | 11/2006 | Kozakaya |
| 2008/0309662 | A1 | 12/2008 | Hassner et al. |
| 2010/0214288 | A1* | 8/2010 | Xiao ............... G06V 10/7557 345/420 |
| 2014/0212031 | A1 | 7/2014 | Tytgat et al. |
| 2014/0233849 | A1 | 8/2014 | Weng et al. |
| 2015/0178988 | A1 | 6/2015 | Montserrat Mora et al. |
| 2015/0235372 | A1 | 8/2015 | Smolyanskiy et al. |
| 2016/0086017 | A1* | 3/2016 | Rodriguez ............. G06T 15/04 382/118 |
| 2016/0379041 | A1 | 12/2016 | Rhee et al. |
| 2017/0069124 | A1 | 3/2017 | Tong et al. |
| 2018/0342110 | A1* | 11/2018 | Miao ..................... G06T 17/10 |
| 2018/0365484 | A1 | 12/2018 | Yu et al. |
| 2019/0262567 | A1 | 8/2019 | Davis |
| 2020/0219302 | A1 | 7/2020 | Tarquini et al. |

FOREIGN PATENT DOCUMENTS

| | | |
|---|---|---|
| CN | 105528805 A | 4/2016 |
| CN | 107704848 A | 2/2018 |
| CN | 107958479 A | 4/2018 |
| CN | 108062791 A | 5/2018 |
| JP | 2009-301353 A | 12/2009 |
| JP | 2011-128966 A | 6/2011 |
| JP | 2016-115118 A | 6/2016 |
| JP | 2017-010543 A | 1/2017 |
| WO | 2013189101 A1 | 12/2013 |
| WO | 2015042867 A1 | 4/2015 |
| WO | 2016029768 A1 | 3/2016 |
| WO | 2020042975 A1 | 3/2020 |

OTHER PUBLICATIONS

Lee, Youn Joo, et al. "Single view-based 3D face reconstruction robust to self-occlusion." EURASIP Journal on Advances in Signal Processing 2012.1 (2012): 1-20 (Year: 2012).*
Kamencay, Patrik, et al. "A novel approach to face recognition using image segmentation based on spca-knn method." Radioengineering 22.1 (2013): 92-99 (Year: 2013).*
Christoph Gratl, "3D Morphable Models", Graz University of Technology institute for Computer Graphics and Vision, Aug. 2012 (Year: 2012).*
Cao, Chen, et al. "Facewarehouse: A 3d facial expression database for visual computing." IEEE Transactions on Visualization and Computer Graphics 20.3 (2013): 413-425. (Year: 2013).*
James Pao, "Emotion Detection Through Facial Feature Recognition", Final Project for Autumn 2016-2017, Stanford University, posted 2017, https://web.stanford.edu/class/ee368/Project_Autumn_1617/Reports/report_pao.pdf (Year: 2017).*
Extended European Search Report for European Application No. 19855542.7 dated Sep. 16, 2021.
Chai et al., "Pose normalization using generic 3D face model as a Priori for pose-insensitive face recognition," Sinobiometrics 2004, Jan. 1, 2004.
Written Opinion and International Search Report for PCT Application No. PCT/CN2019/101715 dated Nov. 21, 2019.
International Preliminary Report on Patentability Chapter I for PCT Application No. PCT/CN2019/101715 dated Mar. 11, 2021.
Office Action for Japanese Application No. 2021-510684 dated May 24, 2022.
Ding et al., "Continuous Pose Normalization for Pose-Robust Face Recognition," IEEE Signal Processing Letters, vol. 19, No. 11, Nov. 2012.
First Search for Chinese Application No. 201810983040.0 dated Nov. 1, 2023.
Zhang, "3D Facial Expression Reconstruction from Video via SFM and Dynamic Texture Mapping," Jun. 15, 2020.

* cited by examiner

FACE POSE ESTIMATION/THREE-DIMENSIONAL FACE RECONSTRUCTION METHOD, APPARATUS, AND ELECTRONIC DEVICE

CROSS-REFERENCE TO RELATED APPLICATIONS

This application is a continuation application of International Application No. PCT/CN2019/101715, filed on Aug. 21, 2019, which is based on and claims priority to and benefits of Chinese Patent Application No. 201810983040.0, filed with the China National Intellectual Property Administration on Aug. 27, 2018. The entire contents of the above-identified applications are incorporated herein by reference.

TECHNICAL FIELD

This application relates to the field of image processing technology, in particular to methods, apparatus, and electronic devices for face pose estimation and three-dimensional face reconstruction.

BACKGROUND

Face pose estimation is a hot topic in the computer field. It refers to determining angle information of a face orientation based on a face image, i.e., calculating three deflection angles: a pitch angle (pitch), a yaw angle (yaw), and a roll angle (roll) based on features of the face image.

Currently, there are many methods for face pose estimation, which can be classified into model-based methods, appearance-based methods, and classification-based methods. Among them, since the face pose obtained by a model-based method is a continuous value, and the pose estimation accuracy is higher, the model-based method has become a common method. A process for a typical model-based face pose estimation method is as follows. First, locating key point (feature point) coordinates in a two-dimensional face image to obtain two-dimensional key points, such as facial features, contours, and the like. Then, constructing a three-dimensional model of a neutral and expressionless average face, and extracting three-dimensional key points with the same semantic meaning as the two-dimensional key points from the three-dimensional model. Next, obtaining a rotation matrix from the three-dimensional average face model to the two-dimensional face image based on coordinate values of the two-dimensional key points, coordinate values of the three-dimensional key points, and a camera focal length. Finally, determining a face pose of the two-dimensional face image based on the rotation matrix.

However, in implementing the present invention, the inventor finds that the existing technologies have at least the following problem: since the three-dimensional average face model and the two-dimensional face image are usually different, when pose estimation is performed on large-angle and exaggerated facial expressions, accuracy of pose estimation is greatly reduced. In summary, the existing technologies have the problem of poor robustness for pose estimation based on a three-dimensional average face model.

SUMMARY

This application discloses a face pose estimation method, apparatus, and electronic device to solve the problem of poor robustness of face pose estimation based on a three-dimensional average face model in prior art. This application also discloses a three-dimensional face reconstruction method, apparatus, and electronic device.

This application discloses a face pose estimation method comprising: acquiring a two-dimensional face image for processing; constructing a three-dimensional face model corresponding to the two-dimensional face image; and determining a face pose of the two-dimensional face image based on face feature points of the three-dimensional face model and face feature points of the two-dimensional face image.

The constructing a three-dimensional face model corresponding to the two-dimensional face image comprises constructing the three-dimensional face model corresponding to the two-dimensional face image by using a face shape fitting algorithm.

The face shape fitting algorithm comprises: determining a projection mapping matrix from a three-dimensional average face model to the two-dimensional face image based on internal face feature points of the two-dimensional face image and internal face feature points of the three-dimensional average face model; constructing a first three-dimensional face model corresponding to the two-dimensional face image based on the projection mapping matrix and feature vectors of a three-dimensional feature face space; performing contour feature point fitting on the first three-dimensional face model based on face contour feature points of the two-dimensional face image; and in response to an error between the two-dimensional face image and the first three-dimensional face model fitted with the face contour feature points being less than a preset error, adopting the first three-dimensional face model fitted with the face contour feature points as the three-dimensional face model.

The method further comprises, in response to the error being greater than or equal to the preset error, constructing the three-dimensional face model corresponding to the two-dimensional face image based on the first three-dimensional face model fitted with the face contour feature points.

The constructing the three-dimensional face model corresponding to the two-dimensional face image comprises constructing the three-dimensional face model corresponding to the two-dimensional face image by using a facial expression fitting algorithm.

The constructing the three-dimensional face model corresponding to the two-dimensional face image comprises constructing the three-dimensional face model corresponding to the two-dimensional face image by using a face shape and expression fitting algorithm.

The face shape and expression fitting algorithm comprises: determining a projection mapping matrix from a three-dimensional average face model to the two-dimensional face image based on internal face feature points of the two-dimensional face image and internal face feature points of the three-dimensional average face model; constructing a first three-dimensional face model corresponding to the two-dimensional face image based on the projection mapping matrix and feature vectors of a three-dimensional feature face space; performing contour feature point fitting on the first three-dimensional face model based on face contour feature points of the two-dimensional face image; performing, based on internal feature points of the two-dimensional face image and at least one facial expression base corresponding to the three-dimensional average face model, expression fitting on the first three-dimensional face model fitted with the contour feature points; and in response to an error between the two-dimensional face image and the first three-dimensional face model fitted with the facial expression being less than a preset error, adopting the first three-dimensional face model fitted with the facial expression as the three-dimensional face model.

The method further comprises, in response to the error being greater than or equal to the preset error, constructing the three-dimensional face model corresponding to the two-dimensional face image based on the three-dimensional face model fitted with the facial expression.

The constructing a first three-dimensional face model corresponding to the two-dimensional face image based on the projection mapping matrix and feature vectors of a three-dimensional feature face space comprises: determining a three-dimensional face shape parameter by minimizing an energy function with the following formula:

$$E = \sum_{i=0}^{3N} \frac{(y_{pro\_2D,i} - y_i)^2}{2\delta_{2D,i}^2} + \|\alpha\|_2^2$$

wherein:
E denotes the energy function,
N denotes the number of internal face feature points,
$y_{pro_{2D},i}$ denotes coordinates of the two-dimensional internal face feature points obtained by projecting the internal face feature points of the three-dimensional average face model into a two-dimensional space through the projection mapping matrix,
$y_i$ denotes coordinates of the internal face feature points of the two-dimensional face image,
$\delta_{2D,i}^2$ denotes a covariance matrix of the internal face feature points of the two-dimensional face image, and
$\alpha$ denotes the three-dimensional face shape parameters.

The coordinates of the two-dimensional internal feature points projected to the two-dimensional space are obtained by using the following formula:

$$y_{pro\_2D} = P \cdot (U\alpha + \overline{v})$$

wherein:
U denotes a matrix composed of feature vectors corresponding to the internal face feature points of the three-dimensional average face model,
P denotes the projection mapping matrix, and
V denotes vertex coordinate data corresponding to semantically related internal feature points on a three-dimensional average face.

The performing the contour feature point fitting on the first three-dimensional face model based on the face contour feature points of the two-dimensional face image comprises: selecting, from the first three-dimensional face model, three-dimensional points corresponding to the face contour feature points of the two-dimensional face image as initial three-dimensional contour feature points; mapping the initial three-dimensional contour feature points to the two-dimensional face image by using the projection mapping matrix; and selecting, by using a nearest neighbor matching algorithm, mapped three-dimensional points corresponding to two-dimensional contour feature points as face contour feature points of the first three-dimensional face model.

The method further comprises determining the three-dimensional average face model and the feature vectors based on three-dimensional face model samples.

The method further comprises determining at least one facial expression base corresponding to the three-dimensional average face model based on three-dimensional face model samples.

This application also discloses a three-dimensional face reconstruction method, comprising: acquiring a two-dimensional face image for processing: determining a projection mapping matrix from a three-dimensional average face model to the two-dimensional face image based on internal feature points of face of the two-dimensional face image and internal feature points of face of the three-dimensional average face model; constructing a first three-dimensional face model corresponding to the two-dimensional face image based on the projection mapping matrix and feature vectors of a three-dimensional feature face space; performing contour feature point fitting on the first three-dimensional face model based on face contour feature points of the two-dimensional face image; and in response to an error between the two-dimensional face image and the fitted first three-dimensional face model being less than a preset error, adopting the fitted first three-dimensional face model as a three-dimensional face model of the two-dimensional face image.

After the performing the contour feature point fitting on the first three-dimensional face model based on the face contour feature points of the two-dimensional face image, the method further comprises performing expression fitting on the first three-dimensional face model fitted with the face contour feature points based on the internal face feature points of the two-dimensional face image and at least one facial expression base corresponding to the three-dimensional average face model.

After the constructing the first three-dimensional face model corresponding to the two-dimensional face image based on the projection mapping matrix and the feature vectors of the three-dimensional feature face space, the method further comprises performing expression fitting on the first three-dimensional face model based on at least one facial expression base corresponding to the three-dimensional average face model.

The performing the contour feature point fitting on the first three-dimensional face model based on the face contour feature points of the two-dimensional face image comprises performing the contour feature point fitting on the first three-dimensional face model fitted with the facial expression based on the face contour feature points of the two-dimensional face image.

The constructing the first three-dimensional face model corresponding to the two-dimensional face image based on to the projection mapping matrix and the feature vectors of a three-dimensional feature face space comprises: determining three-dimensional face shape parameters by minimizing an energy function with the following formula:

$$E = \sum_{i=0}^{3N} \frac{(y_{pro\_2D,i} - y_i)^2}{2\delta_{2D,i}^2} + \|\alpha\|_2^2$$

wherein:
E denotes the energy function,
N denotes the number of internal face feature points,
$y_{pro_{2D},i}$ denotes coordinates of the two-dimensional internal face feature points obtained by projecting the internal face feature points of the three-dimensional average face model into a two-dimensional space through the projection mapping matrix, $y_i$ denotes coordinates of the internal face feature points of the two-dimensional face image, $\delta_{2D,i}^2$ denotes a covariance matrix of the internal face feature points of the two-dimensional face image, and $\alpha$ denotes the three-dimensional face shape parameters.

The coordinates of the two-dimensional internal feature points projected to the two-dimensional space are obtained by using the following formula:

$$y_{pro\_2D} = P \cdot (U\alpha + \overline{v})$$

wherein:
U denotes a matrix composed of feature vectors corresponding to the internal face feature points of the three-dimensional average face model,
P denotes the projection mapping matrix, and
V denotes vertex coordinate data corresponding to semantically related internal feature points on a three-dimensional average face.

The performing the contour feature point fitting on the first three-dimensional face model based on the face contour feature points of the two-dimensional face image comprises: selecting, from the first three-dimensional face model, three-dimensional points corresponding to the face contour feature points of the two-dimensional face image as initial three-dimensional contour feature points; mapping the initial three-dimensional contour feature points to the two-dimensional face image by using the projection mapping matrix; and selecting, by using a nearest neighbor matching algorithm, mapped three-dimensional points corresponding to two-dimensional contour feature points as face contour feature points of the first three-dimensional face model.

The method further comprises, in response to the error being greater than or equal to the preset error, constructing the three-dimensional face model corresponding to the two-dimensional face image based on the fitted three-dimensional face model.

The method further comprises determining the three-dimensional average face model and the feature vectors based on three-dimensional face model samples.

The method further comprises determining at least one facial expression base corresponding to the three-dimensional average face model based on three-dimensional face model samples.

This application further discloses a face pose estimation apparatus, comprising a two-dimensional face image acquisition unit, configured to acquire a to-be-processed two-dimensional face image; a three-dimensional face model construction unit, configured to construct a three-dimensional face model corresponding to the two-dimensional face image; and a face pose determination unit, configured to determine a face pose of the two-dimensional face image based on face feature points of the three-dimensional face model and face feature points of the two-dimensional face image.

The three-dimensional face model construction unit is specifically configured to construct the three-dimensional face model corresponding to the two-dimensional face image by using a face shape fitting algorithm.

The three-dimensional face model construction unit comprises: a projection matrix determination subunit, configured to determine a projection mapping matrix from a three-dimensional average face model to the two-dimensional face image based on internal face feature points of the two-dimensional face image and internal face feature points of the three-dimensional average face model; a first model construction subunit, configured to construct a first three-dimensional face model corresponding to the two-dimensional face image based on the projection mapping matrix and feature vectors of a three-dimensional feature face space; a contour fitting subunit, configured to perform contour feature point fitting on the first three-dimensional model based on face contour feature points of the two-dimensional face image; and a second model determination subunit, configured to use the first three-dimensional face model fitted with the face contour feature points as a three-dimensional face model in response to an error between the two-dimensional face image and the fitted first three-dimensional face model is less than a preset error.

The three-dimensional face model construction unit further comprises: a third model construction subunit configured to construct the three-dimensional face model corresponding to the two-dimensional face image based on the fitted three-dimensional face model if the error is greater than or equal to the preset error.

The three-dimensional face model construction unit is specifically configured to construct the three-dimensional face model corresponding to the two-dimensional face image by using a facial expression fitting algorithm.

The three-dimensional face model construction unit is specifically configured to construct the three-dimensional face model corresponding to the two-dimensional face image by using a face shape and expression fitting algorithm.

The three-dimensional face model construction unit comprises: a projection matrix determination subunit, configured to determine a projection mapping matrix from a three-dimensional average face model to the two-dimensional face image based on internal face feature points of the two-dimensional face image and internal face feature points of the three-dimensional average face model; a first model construction subunit, configured to construct a first three-dimensional face model corresponding to the two-dimensional face image based on the projection mapping matrix and feature vectors of a three-dimensional feature face space; a contour fitting subunit, configured to perform contour feature point fitting on the first three-dimensional model based on face contour feature points of the two-dimensional face image; a facial expression fitting subunit, configured to perform expression fitting on the first three-dimensional face model fitted with the face contour feature points based on the internal face feature points of the two-dimensional face image and at least one facial expression base corresponding to the three-dimensional average face model; and a second model determination subunit, configured to use a three-dimensional face model fitted with the facial expression as the three-dimensional face model if an error between the two-dimensional face image and the three-dimensional face model fitted with the facial expression is less than a preset error.

The apparatus further comprises a third model construction subunit configured to construct the three-dimensional face model corresponding to the two-dimensional face image based on the three-dimensional face model fitted with the facial expression if the error is greater than or equal to the preset error.

The contour fitting subunit comprises: a first contour feature point selection subunit, configured to select, from the first three-dimensional face model, three-dimensional points corresponding to the face contour feature points of the two-dimensional face image as initial three-dimensional contour feature points; a contour feature point mapping subunit, configured to map the initial three-dimensional contour feature points to the two-dimensional face image by using the projection mapping matrix; and a second contour feature point selection subunit, configured to select, by using a nearest neighbor matching algorithm, mapped three-dimensional points corresponding to two-dimensional contour feature points as face contour feature points of the first three-dimensional face model.

The apparatus further comprises a first prior data determination unit configured to determine the three-dimensional average face model and the feature vectors based on three-dimensional face model samples.

The apparatus further comprises a second prior data determination unit configured to determine at least one facial expression base corresponding to the three-dimensional average face model based on three-dimensional face model samples.

This application further discloses a three-dimensional face reconstruction apparatus, comprising: a two-dimensional face image acquisition unit, configured to acquire a two-dimensional face image for processing; a projection matrix determination subunit, configured to determine a projection mapping matrix from a three-dimensional average face model to the two-dimensional face image based on internal face feature points of the two-dimensional face image and internal face feature points of the three-dimensional average face model; a first model construction subunit, configured to construct a first three-dimensional face model corresponding to the two-dimensional face image based on the projection mapping matrix and feature vectors of a three-dimensional feature face space; a contour fitting subunit, configured to perform contour feature point fitting on the first three-dimensional face model based on face contour feature points of the two-dimensional face image; and a second model determination unit configured to use the fitted three-dimensional face model as a three-dimensional face model of the two-dimensional face image if an error between the two-dimensional face image and the fitted three-dimensional face model is less than a preset error.

The apparatus further comprises: a first facial expression fitting unit, configured to perform, based on the internal face feature points of the two-dimensional face image and at least one facial expression base corresponding to the three-dimensional average face model, expression fitting on the three-dimensional face model fitted with the face contour feature points.

The apparatus further comprises a second facial expression fitting unit, configured to perform expression fitting on the first three-dimensional face model based on at least one facial expression base corresponding to the three-dimensional average face model.

The contour fitting subunit is specifically configured to perform contour feature point fitting on the first three-dimensional face model fitted with the facial expression based on the face contour feature points of the two-dimensional face image.

The contour fitting subunit comprises: a first contour feature point selection subunit, configured to select, from the first three-dimensional face model, three-dimensional points corresponding to the face contour feature points of the two-dimensional face image as initial three-dimensional contour feature points; a contour feature point mapping subunit, configured to map the initial three-dimensional contour feature points to the two-dimensional face image by using the projection mapping matrix; and a second contour feature point selection subunit, configured to select, by using a nearest neighbor matching algorithm, mapped three-dimensional points corresponding to two-dimensional contour feature points as face contour feature points of the first three-dimensional face model.

The apparatus further comprises a third model construction subunit configured to construct the three-dimensional face model corresponding to the two-dimensional face image based on the fitted three-dimensional face model if the error is greater than or equal to the preset error.

The apparatus further comprises a first prior data determination unit configured to determine the three-dimensional average face model and the feature vectors based on three-dimensional face model samples.

The apparatus further comprises a second prior data determination unit configured to determine at least one facial expression base corresponding to the three-dimensional average face model based on three-dimensional face model samples.

This application further discloses an electronic device, comprising: a processor; and a memory, configured to store a program for implementing a face pose estimation method, wherein the device, after being powered on and running the program of the face pose estimation method through the processor, performs the following steps: acquiring a two-dimensional face image for processing; constructing a three-dimensional face model corresponding to the two-dimensional face image; and determining a face pose of the two-dimensional face image based on face feature points of the three-dimensional face model and face feature points of the two-dimensional face image.

This application further discloses an electronic device, comprising: a processor; and a memory, configured to store a program for implementing a three-dimensional face reconstruction method, wherein the device, after being powered on and running the program of the three-dimensional face reconstruction method through the processor, performs the following steps: acquiring a two-dimensional face image for processing; determining a projection mapping matrix from a three-dimensional average face model to the two-dimensional face image based on internal face feature points of the two-dimensional face image and internal face feature points of the three-dimensional average face model; constructing a first three-dimensional face model corresponding to the two-dimensional face image based on the projection mapping matrix and feature vectors of a three-dimensional feature face space; performing contour feature point fitting on the first three-dimensional face model based on face contour feature points of the two-dimensional face image; and in response to an error between the two-dimensional face image and the fitted first three-dimensional face model is less than a preset error, using the fitted first three-dimensional face model as a three-dimensional face model of the two-dimensional face image.

This application further discloses a computer-readable storage medium. The computer-readable storage medium stores instructions, which when run on a computer, cause the computer to perform the above various methods.

This application further discloses a computer program product including instructions, which when run on a computer, causes the computer to perform the above various methods.

Compared with the prior art, this application has the following advantages. The face pose estimation method disclosed by the embodiments of this application constructs a three-dimensional face model corresponding to a two-dimensional face image acquired for processing. Based on face feature points of the three-dimensional face model and face feature points of the two-dimensional face image, a face pose of the two-dimensional face image is determined. With this approach, face pose estimation is performed based on a three-dimensional face model corresponding to the two-dimensional face image, instead of only based on a three-dimensional average face model, so that a high accuracy of pose estimation can be obtained even for large-angle and exaggerated facial expressions. Thus, robustness of pose estimation can be effectively improved.

The three-dimensional face reconstruction method disclosed by the embodiments of this application acquires a two-dimensional face image for processing. Based on internal face feature points of the two-dimensional face image and internal face feature points of a three-dimensional average face model, a projection mapping matrix from the three-dimensional average face model to the two-dimensional face image is determined. Based on the projection mapping matrix and feature vectors of a three-dimensional feature face space, a first three-dimensional face model corresponding to the two-dimensional face image is constructed. Based on facial contour feature points of the two-dimensional facial image, contour feature point fitting is performed on the first three-dimensional face model. If an error between the two-dimensional face image and the fitted first three-dimensional face model is less than a preset error, the fitted first three-dimensional face model is used as a three-dimensional face model of the two-dimensional face image. This approach enables a fitting of the three-dimensional face model based on prior three-dimensional face data, takes account of a combination of internal face feature points and external contour feature points, and then performs fitting iterations. As a result, this approach minimizes the error between the three-dimensional face model and the two-dimensional face image, enables restoration of a real face as faithful as possible so that the reconstructed three-dimensional face model conforms to biological characteristics of a face, thereby effectively improves accuracy of the three-dimensional face reconstruction.

DETAILED DESCRIPTION OF THE INVENTION

In the following description, many details are provided to give a full understanding of this application. However, this application can be implemented in many other ways different from those described herein, and a person skilled in the art may make similar modifications without departing from the content of this application. Therefore, this application is not limited to the embodiments disclosed below.

This application discloses a method, apparatus, and electronic device for face pose estimation, and a method, apparatus, and electronic device for three-dimensional face reconstruction. Face pose estimation plays an important role in face reconstruction and virtual try-on in three-dimensional spaces. For example, the face pose estimation may be applied to fields such as three-dimensional augmented reality stickers (AR stickers), three-dimensional face changing, and three-dimensional AR glasses. Detailed descriptions are provided in the following embodiments.

First Embodiment

Figure 1:
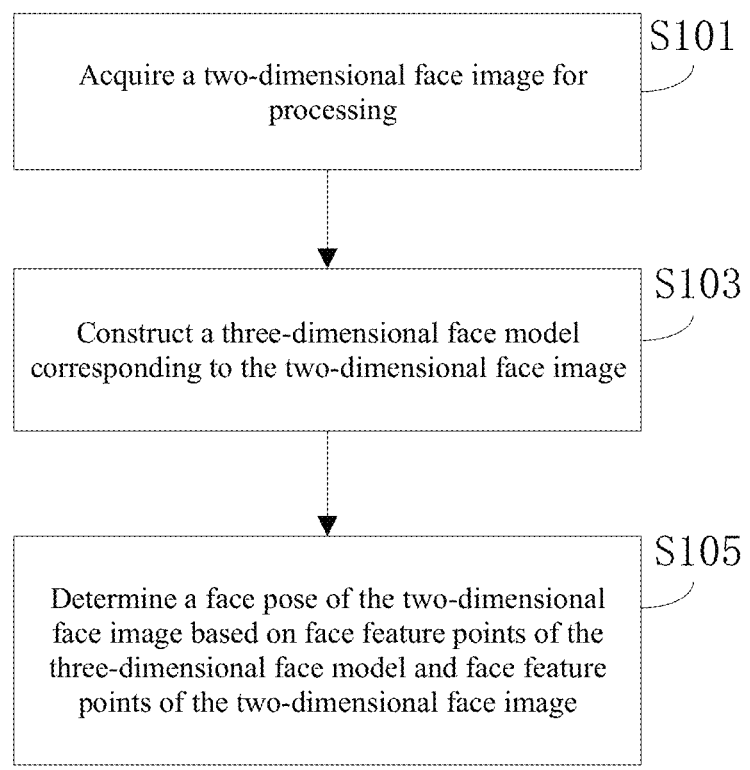
FIG. 1 illustrates a flowchart of a face pose estimation method, in accordance with an embodiment of the disclosure.

FIG. 1 illustrates a flowchart of a face pose estimation method, in accordance with an embodiment of the disclosure. An executor of the method is a face pose estimation apparatus, which is usually deployed on a server, but is not limited to the server. The executor of the method may be any device that can implement the face pose estimation method.

Figure 2:
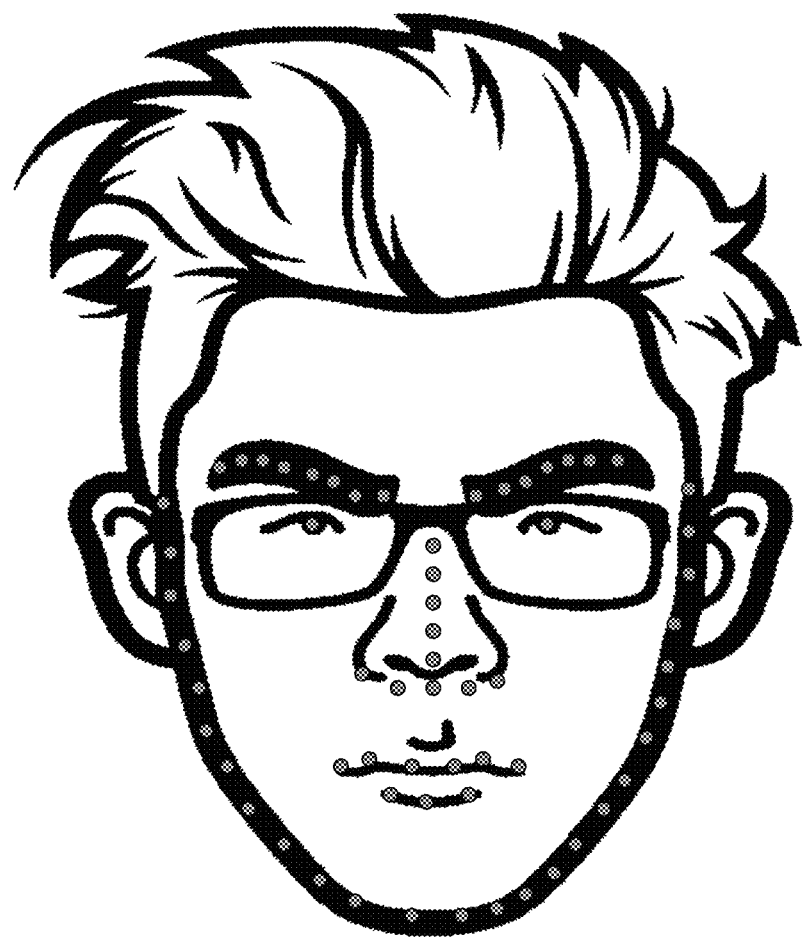
FIG. 2 illustrates a schematic diagram of a two-dimensional face image for the face pose estimation method, in accordance with an embodiment of the disclosure.

In Step S101, a two-dimensional face image is acquired for processing. The two-dimensional face image may be a two-dimensional face image captured by using an image acquisition device such as a camera. The two-dimensional face image comprises a plurality of pixels. For example, the two-dimensional face image shown in FIG. 2 comprises 256*256 pixels.

In Step S103, a three-dimensional face model corresponding to the two-dimensional face image is Constructed. The face pose estimation method disclosed in this application reconstructs the three-dimensional face model corresponding to the two-dimensional face image by introducing a three-dimensional face reconstruction technology, and extracts feature points from the three-dimensional face model that have the same semantic relationship as those of the two-dimensional face image, so as to further solve a two-dimensional face pose.

In one example, a three-dimensional face model corresponding to the two-dimensional face image is constructed by using a face shape fitting algorithm. In this way, a three-dimensional face model having a similar face angle with the corresponding two-dimensional face image is constructed. Thus, when the face pose estimation is performed on a face with a large angle, a high accuracy pose estimation can still be obtained. Therefore, the robustness of pose estimation can be effectively improved.

In another example, the three-dimensional face model corresponding to the two-dimensional face image is constructed by using a facial expression fitting algorithm. In this way, a three-dimensional face model having similar facial expressions with the corresponding two-dimensional face image is constructed. Thus, when the pose estimation is performed on a face with exaggerated facial expressions, a high accuracy pose estimation can still be obtained. Therefore, the robustness of pose estimation can be effectively improved.

In yet another example, the three-dimensional face model corresponding to the two-dimensional face image is constructed by using a face shape and facial expression fitting algorithm. In this way, a three-dimensional face model having a similar face angle and similar facial expressions with the corresponding two-dimensional face image is constructed. Thus, when pose estimation is performed on a face with a large-angle and exaggerated facial expressions, a high accuracy pose estimation can still be obtained. Therefore, the robustness of pose estimation can be effectively improved.

In Step S105: Determining a face pose of the two-dimensional face image based on face feature points of the three-dimensional face model and face feature points of the two-dimensional face image.

After the three-dimensional face model corresponding to the two-dimensional face image is reconstructed through the above steps, the face pose estimation may be performed on the two-dimensional face image based on the reconstructed three-dimensional face model. In this embodiment, the face pose of the two-dimensional face image can be determined based on the face feature points of the three-dimensional face model and the face feature points of the two-dimensional face image.

The face feature points may be obtained by analyzing with a face feature point positioning algorithm. The 66 face feature points shown in FIG. 2 include 49 internal feature points and 17 contour feature points.

The face feature point positioning algorithm includes, but is not limited to the following categories: 1) optimization-based methods, such as ASM (Active Shape Model), AAM (Active Appearance Model), CLM (Constrained Local Model), etc.; 2) regression-based methods, such as CPR (Cascaded Pose Regression), SDM (Supervised Descent Method), ESR (Explicit Shape Regression), etc.; 3) deep-learning-based methods, such as CNN (Convolutional Neural Network), DAE (Deep Autoencoder), RBM (Restricted Boltzmann Machine), etc.

In one example, a process of Step S105 is described as follows. First, face feature point coordinates are determined on a two-dimensional face image by using the face feature point positioning algorithm, and two-dimensional key points are obtained. Three-dimensional key points with the same semantic meaning as the two-dimensional key points are extracted from a reconstructed three-dimensional model. Then, a rotation matrix from the reconstructed three-dimensional face model to the two-dimensional face image is obtained based on coordinates of the two-dimensional key points, coordinates of the three-dimensional key points, and a camera focal length. Finally, a face pose of the two-dimensional face image is determined based on the rotation matrix.

Figure 3:
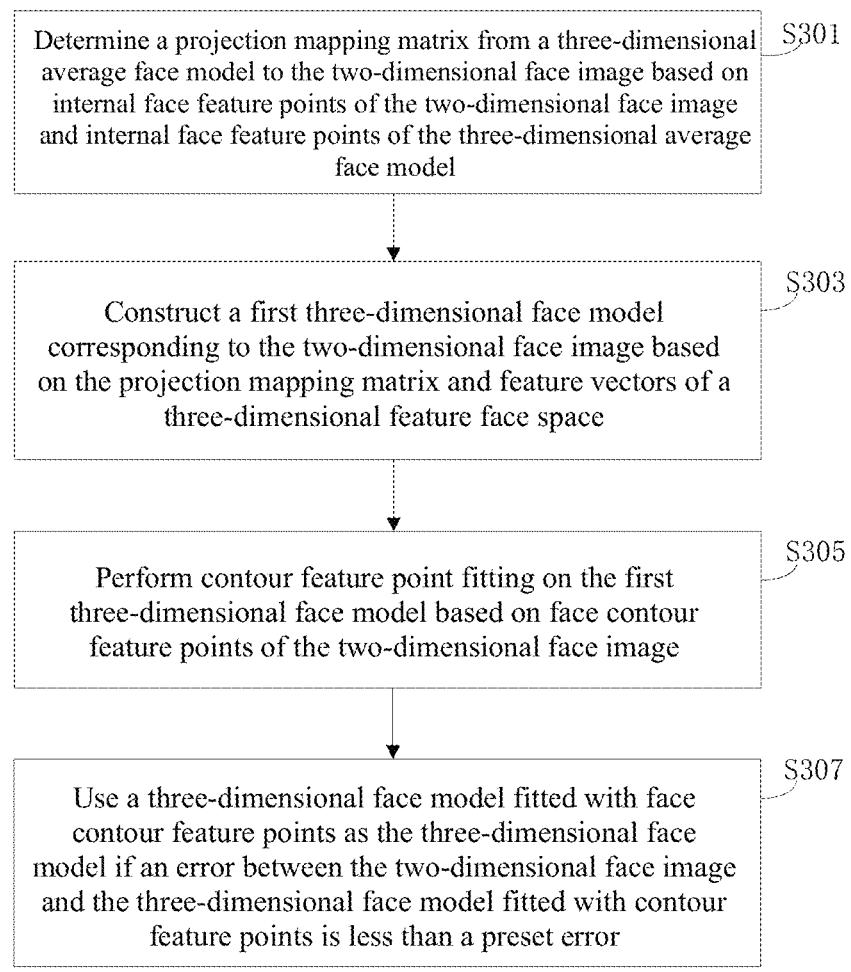
FIG. 3 illustrates a flowchart of face shape fitting of the face pose estimation method, in accordance with an embodiment of the disclosure.

FIG. 3 illustrates a flowchart of face shape fitting of the face pose estimation method, in accordance with an embodiment of the disclosure. Because the face shape fitting algorithm adopted in this embodiment is implemented based on three-dimensional face prior data, the following first describes the three-dimensional face prior data and generation process thereof.

The three-dimensional face prior data may include a three-dimensional average face model, feature vectors of a three-dimensional feature face space, and a feature value of each three-dimensional face model sample.

Figure 4:
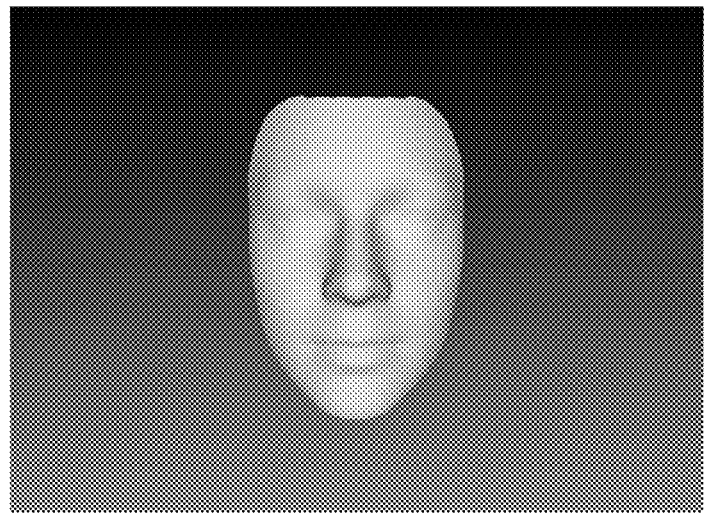
FIG. 4 illustrates a schematic diagram of a three-dimensional average face model of the face pose estimation method, in accordance with an embodiment of the disclosure.

The three-dimensional average face model includes a three-dimensional average face model calculated based on a plurality of three-dimensional face model samples. Each three-dimensional face model sample may be converted into a multi-dimensional vector. After a vector set of the three-dimensional face model samples is obtained, vectors in the vector set are traversed and accumulated, and then the average of the vectors are obtained to get the three-dimensional average face model. FIG. 4 shows a three-dimensional average face model in this embodiment, and the model is a three-dimensional average face model with a neutral facial expression.

In one example, the three-dimensional face model samples are generated by using the following steps: 1) obtain multiple three-dimensional face datasets, such as a Surrey Face Model (SFM) dataset, a Basel Face Model (BFM) dataset, etc., where the Surrey Face Model face data set includes 169 three-dimensional face models with a neutral facial expression, each of the models containing 3448 vertices, and The Basel Face Model face data set includes 100 three-dimensional face models of European male and 100 three-dimensional face models of European female, each of the models containing 53215 vertices; 2) unify data of models having different quantities of vertices and different three-dimensional network topology structures into data of models having the same quantity of vertices and the same three-dimensional network topology structure, the unified data serving as the three-dimensional face model samples.

In this embodiment, the three-dimensional face model samples are constructed based on the SFM and the BFM datasets. Neither the SFM nor the BFM provides original three-dimensional face model data, and only provides files M, V, and E after feature compression using principal component analysis (PCA), where M denotes average face data, V denotes feature vectors of a three-dimensional feature face space, and E denotes feature values and a re-parameterized face. Thus, in this embodiment, positive and negative standard deviations of the feature values are first obtained by random sampling, and three-dimensional face structure data is reconstructed by using a formula $S_{3D}=M+V*E_{new}$. In this embodiment, three-dimensional face structure data of 200 neutral facial expressions are constructed based on the SFM datasets, and three-dimensional face structure data of 200 faces are constructed based on the BFM feature datasets.

Since the spatial scales of the three-dimensional model data corresponding to the SFM and the BFM are different, the dimensions of the two feature datasets need to be unified.

In this embodiment, the dimensions of the two feature datasets are uniformly adjusted to a scale of the three-dimensional average face of the SFM dataset. A specific method may be performing conversion by solving a transformation matrix of the two model datasets in three dimensions (x, y, z). The specific steps are as follows:

1) In the two three-dimensional average face models, 66 three-dimensional key index values related to key positioning semantics of the two-dimensional face image are obtained by using a tool (e.g., the face feature point positioning algorithm).

2) By using an iterative closest point (ICP) algorithm based on 66 three-dimensional point pairs, two data sets are respectively set as P and Q:

$$\vec{p}_i \in P, \vec{q}_i \in Q (i=0,1 \ldots 66)$$

Space conversion parameters R (3*3 rotation matrix) and T (tx, ty, tz) between the two three-dimensional point sets are solved by using the two three-dimensional point sets. Assuming that three-dimensional points of two three-dimensional face models in a three-dimensional space are:

$$\vec{p}_i=(x_i,y_i,z_i), \vec{q}_j=(x_j,y_j,z_j).$$

A Euclidean distance between the two sets of points may be expressed as:

$$d(\vec{p}_i,\vec{p}_q)=\|\vec{p}_i-\vec{q}_j\|=\sqrt{(x_i-x_j)^2+(y_i-y_j)^2+(z_i-z_j)^2}.$$

The purpose of coordinate normalization between the two models is to find the transformation matrices R and T between P and Q. For $$\vec{q}_i = R \cdot \vec{p}_i + T,$$

where i=0, 1, 2 . . . 66, the optimal conversion parameters R and T are solved by using a least square method, so that $$E = \sum_{i=1}^{N} |(R \cdot \vec{p}_i + T) - \vec{q}_i|^2,$$

where N denotes 66 key points.

3) Through the previous steps, the optimal conversion matrices R and T of the two sets of three-dimensional models in the three-dimensional space scale are obtained. The parameters may be changed subsequently. In this embodiment, 200 three-dimensional face model scales constructed based on the BFM are converted into the SFM model scales.

4) Three-dimensional models of the same spatial coordinate scale are obtained through step 3). However, because the numbers of vertices of the two three-dimensional models are different, 3448 vertex index values related to SFM semantics need to be selected from 53215 vertices of the BFM. A specific method may be comparing a distance from each vertex of the SFM model to a vertex of the BFM and recording an index of the vertex with the smallest distance. In this way, 3348 vertex index values are obtained. Based on these vertex index values, models are obtained by segmenting the 200 three-dimensional face models of the BFM. Thus, three-dimensional face models having the same quantity of vertices and the same network topology structure as the SFM three-dimensional data are obtained. Therefore, 400 three-dimensional face model samples with neutral facial expressions are constructed.

After the three-dimensional face model samples are obtained, the three-dimensional average face model, the feature vectors, and the feature values may be calculated by using a dimensionality reduction algorithm. In this embodiment, the dimensionality reduction processing is performed on the sample data by using a PCA algorithm. The PCA algorithm indicates that any specific human face may be represented by a low-dimensional feature subspace and may be approximately reconstructed by using this feature subspace. Features selected by using the PCA algorithm maximize differences between three-dimensional face model samples, but also retain some unnecessary changes caused by lighting and facial expressions. Changes in the same person due to lighting may be greater than changes between different people. Because the PCA algorithm implements the process of dimensionality reduction, it makes data processing easier and faster. In this embodiment, the specific method may include the following steps:

1) Based on 400 three-dimensional face model samples with neutral facial expressions, an average face model of all models is obtained by calculating $\overline{S}=\sum_{i=0}^{i=N} S_i/N$, where $\overline{S}$ is the three-dimensional average face model, $S_i$ is the three-dimensional average face model sample, and N=400.

2) Distance data $\Delta S_i = S_i - \overline{S}$ is obtained by subtracting the three-dimensional average face model from all models. A face shape covariance matrix $C_s$ is obtained by compressing data of the 400 three-dimensional face model samples with neutral facial expressions using the PCA algorithm. An orthogonal base representation formed by corresponding feature vectors $S_i$ (corresponding feature values are sorted in descending order) of the covariance matrix is also obtained:

$$S_{model} = \overline{S} + \sum_{i=1}^{m-1} \alpha_i s_i,$$

where $\alpha=[\alpha_1, \alpha_2, \ldots, \alpha_{m-1}]^T$, and the probability of the parameter $\alpha$ is $$p(\alpha) = \exp\left[-\frac{1}{2}\sum_{i=1}^{m-1}\left(\frac{\alpha_i}{\sigma_i}\right)^2\right],$$

where $\sigma_i^2$ is a feature value of the face shape covariance matrix $C_s$.

So far, based on the 400 three-dimensional average face model samples, the three-dimensional average face model $\overline{S}$, a face shape feature vector set $\{s_1, s_2, \ldots, s_{3n}\}$, and a corresponding feature value set $\{\sigma_{s,1}, \sigma_{s,2}, \ldots \sigma_{s,3n}\}$ are determined, where n denotes the number of vertices of the three-dimensional face model.

After the three-dimensional face prior data is acquired, the face shape fitting algorithm shown in FIG. 3 may be used to construct the three-dimensional face model corresponding to the two-dimensional face image.

As shown in FIG. 3, the face shape fitting algorithm in this embodiment includes the following steps.

In Step S301, a projection mapping matrix from a three-dimensional average face model to the two-dimensional face image is determined based on internal face feature points of the two-dimensional face image and internal face feature points of the three-dimensional average face model.

After the two-dimensional face image and the three-dimensional average face model are obtained, and after internal face feature points of the two-dimensional face image (hereinafter referred to as two-dimensional internal feature points) and internal face feature points of the three-dimensional average face model (hereinafter referred to as three-dimensional internal feature points) are determined by using the face feature point positioning algorithm, the projection mapping matrix from the three-dimensional average face model to the two-dimensional face image can be determined based on the two-dimensional internal feature points and the three-dimensional internal feature points.

The internal feature points of face refer to face feature points excluding face contour feature points such as eyes, nose tip, mouth corner points, eyebrows, and other important feature points.

The two-dimensional internal feature points and the three-dimensional internal feature points have the same semantics, that is, the two-dimensional internal feature points include feature points such as eyes, nose tip, mouth corner points, and eyebrows, and the three-dimensional internal feature points also include eyes, nose tip, mouth corner points, and eyebrows.

The projection mapping matrix may be represented by a mathematical expression $P=K[R|T]$, where P denotes the projection mapping matrix, K denotes an internal parameter matrix of a camera, R denotes a rotation matrix, and T denotes a translation matrix. Based on the projection mapping matrix, the three-dimensional face model may be projected to a two-dimensional plane to obtain a two-dimensional face image. The projection process includes transformations such as rotation, scaling, and deformation. $[R|T]$ and K are expressed as follows:

$$[R\,|\,T] = \begin{bmatrix} \alpha_{11} & \alpha_{12} & \alpha_{13} & T_x \\ \alpha_{21} & \alpha_{22} & \alpha_{23} & T_y \\ \alpha_{31} & \alpha_{32} & \alpha_{33} & T_z \end{bmatrix}, K = \begin{bmatrix} \alpha_x & & x_0 \\ & \alpha_y & y_0 \\ & & 1 \end{bmatrix}$$

The projection mapping matrix may be determined by using the method described below.

Assuming that coordinates of a feature point of the two-dimensional face image are $p_i=(x_i, y_i)$, coordinates of a corresponding feature point of the three-dimensional average face model are $P_i=(X_i, Y_i, Z_i)$, and a corresponding relationship between the feature point of the two-dimensional face image and the feature point of the three-dimensional average face model is $(p_i, P_i)=(x_i, y_i, X_i, Y_i, Z_i)$. A projection mapping matrix between the two may be solved. Assuming that three rotation angles are roll, yaw, and pitch, then $R=(r_1, r_2, r_3)=R_{roll}*R_{yaw}*R_{pitch}$, where $$R_{yaw} = \begin{bmatrix} \cos(yaw) & 0 & \sin(yaw) \\ 0 & 1 & 0 \\ -\sin(yaw) & 0 & \cos(yaw) \end{bmatrix}$$

$$R_{roll} = \begin{bmatrix} \cos(roll) & -\sin(roll) & 0 \\ \sin(roll) & \cos(roll) & 0 \\ 0 & 0 & 1 \end{bmatrix}.$$

According to a camera imaging principle, $$x_i=f*(r*P_i+T_1)/(r_3*P_i+T_3), y_i=f*(r_2*P_i)/(e_3*P_i+T_3),$$

where $T=(T_1, T_2, T_3, T_4)$,
the following formula can be obtained based on a perspective model: $K*[R$ (roll, yaw, pitch)$*P_i+T]$. In the pose estimation, K is a known camera parameter, $P_i$ is the coordinate of a feature point of the three-dimensional average face model, and $p_i$ is coordinate of an obtained two-dimensional image. Because the coordinates obtained in this way has a deviation compared with coordinates of a face key point, the problem is transformed into an optimization problem: (roll, yaw, pitch)=argmin$\{p_i-Aq*[R$(roll, yaw, pitch)$*P_i+T]\}$ (i=0, 1, 2 . . . n). The next step is to obtain an optimal solution of the formula by using a least squares method. In this embodiment, a relatively stable value can be obtained after multiple iterations. In this way, a rotation matrix R and an offset matrix T can be obtained, and a transformation relationship P from three-dimensional coordinate points to two-dimensional coordinate points can be obtained through transformation, i.e., the projection mapping matrix.

In Step S303, a first three-dimensional face model corresponding to the two-dimensional face image is constructed based on the projection mapping matrix and feature vectors of a three-dimensional feature face space.

In the previous step, the projection mapping matrix P from the three-dimensional internal feature point to the two-dimensional internal feature point is obtained. In this step, a coarse-precision three-dimensional face shape (i.e., the first three-dimensional face model) first needs to be fitted based on the projection mapping matrix and the feature vectors without considering an outer contour of the face.

In one example, step S303 may be implemented in the following manner: after the projection mapping matrix is obtained, the feature vectors can be used to fit a face shape parameter $\alpha$, which can be specifically obtained by minimizing an energy function. The function is as follows:

$$E = \sum_{i=0}^{3N} \frac{(y_{pro\_2D,i} - y_i)^2}{2\delta_{2D,i}^2} + \|\alpha\|_2^2,$$

where N denotes the number (e.g., 49) of internal feature points of face, $y_{pro\_2D,i}$ denotes a coordinate value of the two-dimensional internal feature point obtained by projecting the three-dimensional internal feature point to a two-dimensional space through the projection mapping matrix, $y_j$ denotes a coordinate value of the two-dimensional internal feature point obtained by using a face feature point positioning algorithm, $\delta_{2D,i}^2$ denotes a covariance matrix of the two-dimensional internal feature points obtained by using the face feature point positioning algorithm, and $\alpha$ is a shape parameter to be solved and is also referred to as a shape coefficient.

In specific implementation, the shape parameter $\alpha$ may be solved in the following manner: from trained feature vectors of face shape data (feature vectors of the three-dimensional feature face space) $\{s_1, s_2, \ldots, s_{3n}\}$ (where n is the quantity of vertices of the three-dimensional face model, and $s_i$ is the feature vector), obtain an index value that has the same semantic information as the corresponding 49 three-dimensional internal feature points (the index value mainly includes a vector base of 49*3 rows, every three rows representing coordinates of one vertex, and corresponds to a sequence number of a three-dimensional vertex from 0 to 48). The obtained feature vectors are formed into a new matrix U, and then the matrix U is mapped by using the projection mapping matrix P: $y_{pro\_2D}=P\cdot(U\alpha+\bar{v})$, where $\alpha$ is a coefficient to be solved. In this way, the three-dimensional internal feature points are converted to coordinate points corresponding to the corresponding two-dimensional face image, an error with original two-dimensional internal feature points in the two-dimensional face image is calculated, and E is minimized. After $\alpha$ is obtained, a mathematical expression of the first three-dimensional face model is obtained as follows:

$$S_{model}=\bar{S}+\Sigma_{i=1}^{m-1}\alpha_i s_i,$$

where $s_i$ denotes a face shape feature vector, and $\overline{S}$ denotes trained average face data.

In Step S305, contour feature point fitting on the first three-dimensional face model is performed based on face contour feature points of the two-dimensional face image.

After the coarse-accuracy first three-dimensional face model corresponding to the two-dimensional face image is obtained in the previous step, in this step, face contour information is added to the first three-dimensional face model to generate a more accurate three-dimensional face model.

In one example, Step S305 may include the following sub-steps: 1) from the first three-dimensional face model, selecting three-dimensional points (e.g., nearest points) corresponding to the face contour feature points of the two-dimensional face image as initial three-dimensional contour feature points; 2) mapping the initial three-dimensional contour feature points to the two-dimensional face image by using the projection mapping matrix P; 3) based on a nearest neighbor matching method (e.g., kdtree), selecting index values of three-dimensional points corresponding to two-dimensional contour feature points that are obtained through mapping, thereby obtaining face contour feature points of the first three-dimensional face model.

In Step S307: If an error between the two-dimensional face image and the three-dimensional face model fitted with the face contour feature points is less than a preset error, the three-dimensional face model fitted with the face contour feature points is used as the three-dimensional face model.

The face contour feature points of the first three-dimensional face model obtained in the previous step and internal face feature points of the first three-dimensional face model are put together to obtain the first three-dimensional face model with added face contour feature points. If an error between the two-dimensional face image and the three-dimensional face model fitted with the face contour feature points is less than the preset error, the three-dimensional face model fitted with the face contour feature points is used as the three-dimensional face model corresponding to the two-dimensional face image.

Figure 5:
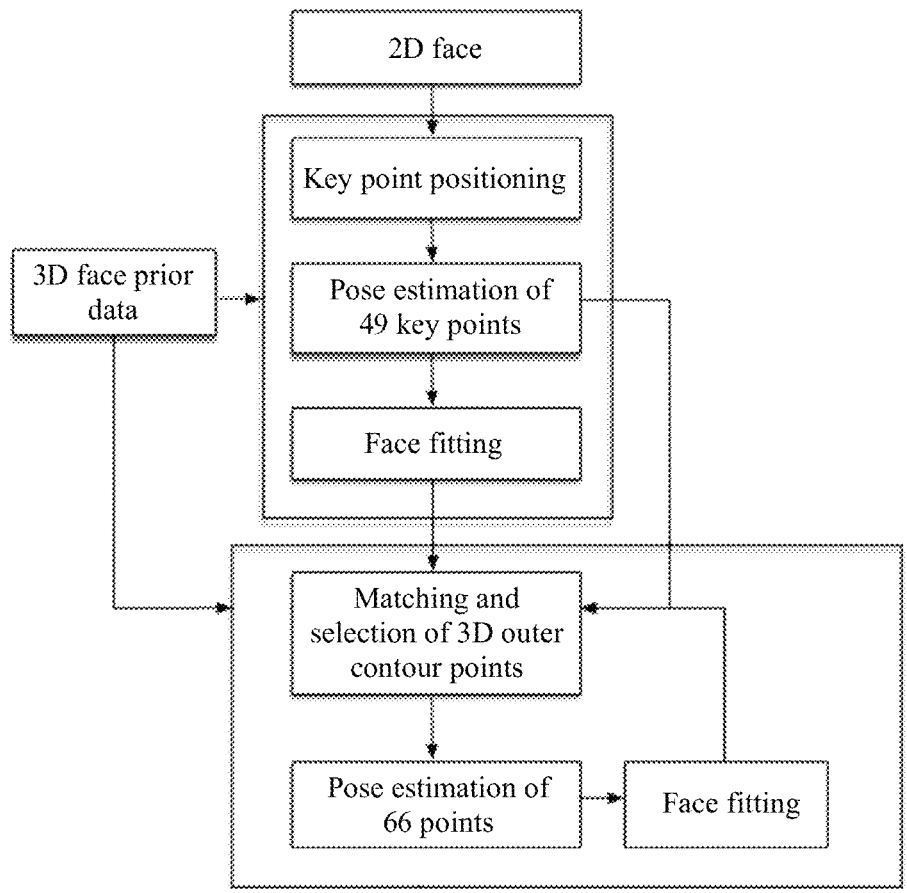
FIG. 5 illustrates an exemplary flowchart of face shape fitting of the face pose estimation method, in accordance with an embodiment of the disclosure.

FIG. 5 illustrates an exemplary flowchart of face shape fitting of the face pose estimation method, in accordance with an embodiment of the disclosure. If the error above is greater than or equal to the preset error, the foregoing steps S301, S303, S305, and S307 are performed based on the three-dimensional face model fitted with the face contour feature points. That is, the three-dimensional average face model in these steps is replaced with the previously built three-dimensional face model fitted with the face contour feature points, and a new three-dimensional face model is formed each time. After iterating of the foregoing process for many times and when the error is less than the preset error, the iteration is stopped, and a three-dimensional face model of the two-dimensional face image is reconstructed.

The face shape fitting algorithm that can be used in the method disclosed in this application is described above, and a facial expression fitting algorithm is described below.

Figure 6:
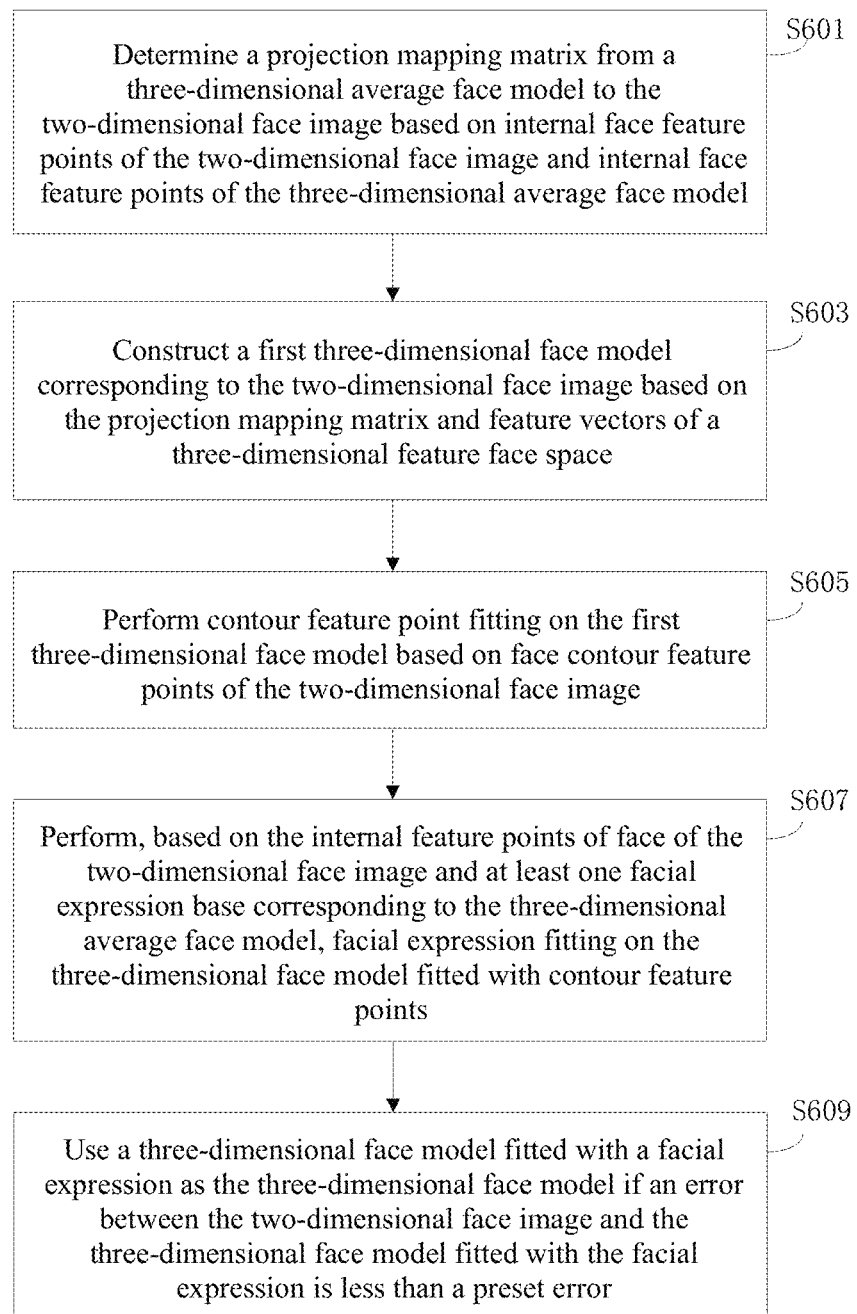
FIG. 6 illustrates a flowchart of face shape and expression fitting of a face pose estimation method, in accordance with an embodiment of the disclosure.

FIG. 6 illustrates a flowchart of face shape and expression fitting of a face pose estimation method, in accordance with an embodiment of the disclosure. Since the facial expression fitting algorithm used in this embodiment is implemented based on facial expression base data included in three-dimensional face prior data, the following describes at first the facial expression base data and a generation process thereof.

Figure 7:
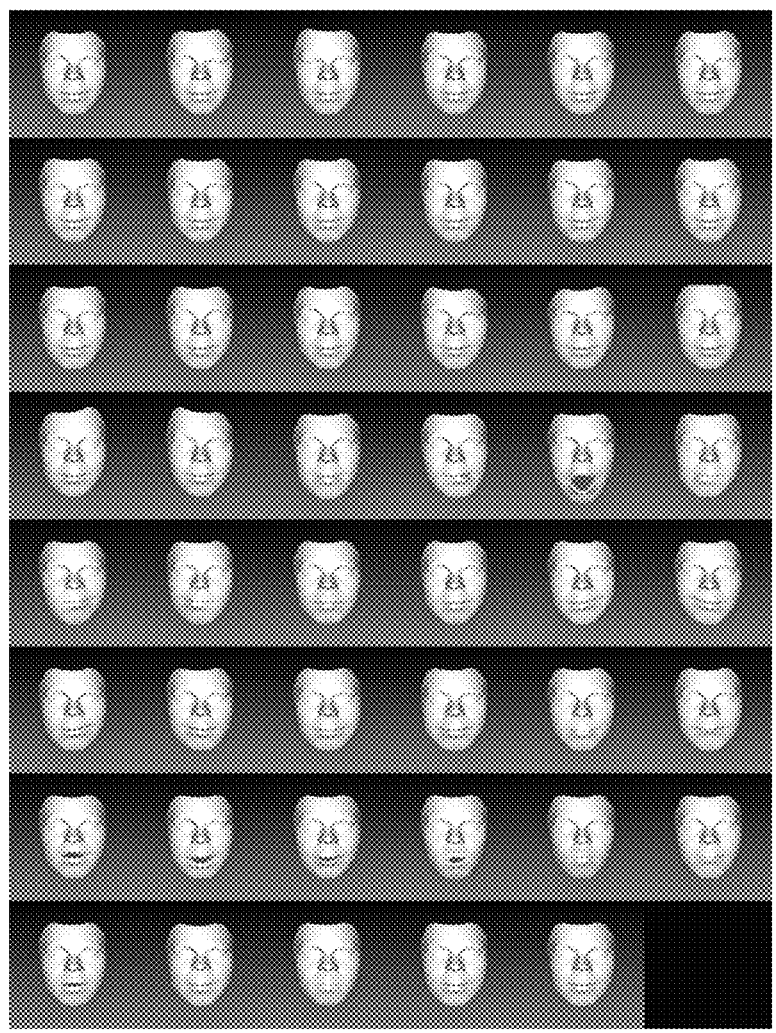
FIG. 7 illustrates a schematic diagram of various facial expressions of a three-dimensional average face model of the face pose estimation method, in accordance with an embodiment of the disclosure.

In one example, for the 400 three-dimensional face model samples with neutral facial expressions constructed above, for each face, additional 46 facial expressions are constructed. This is equivalent to constructing 400*47 three-dimensional face model samples, thereby obtaining facial expression fitting data. FIG. 7 shows 47 facial expressions corresponding to one three-dimensional face model sample in this embodiment.

The facial expression may be a basic facial expression, such as: angry, timid, disgusted, bored, surprised, worried, happy, hateful, sad, etc. The facial expression may also be a compound facial expression, such as: angry+disgusted, angry+surprised, very angry, very disgusted, very surprised, happy+disgusted, joyful+surprised, sad+angry, sad+disgusted, sad+scared, sad+surprised, etc.

During implementation, various facial expression construction methods in existing technologies may be used to construct three-dimensional face models of the additional 46 facial expressions for a three-dimensional face model with neutral facial expressions. For example, the following facial expression construction method may be used to construct the three-dimensional face models of the additional 46 facial expressions. The shape transfer between triangular meshes of two sets of three-dimensional models does not require a source model and a target model having the same number of vertices or triangles or the same connectivity. By specifying a set of vertex marks, a user establishes a correspondence between triangles of a source model and a target model. By computing a mapping transformation matrix of the correspondence between the source model and the target model, and by solving an optimization problem, the original model is transformed to a target shape.

After the three-dimensional face model samples of the 46 facial expressions are obtained, difference data of the 46 facial expressions (i.e., facial expression bases) can be calculated. During implementation, various facial expression bases X corresponding to the three-dimensional average face model may be obtained through the following steps: 1) for each facial expression, based on the 400 three-dimensional face model samples corresponding to the facial expression, obtaining a three-dimensional average face model of the facial expression, also referred to as an average facial expression, thereby obtaining 47 average facial expressions, which includes an average facial expression corresponding to the neutral facial expression; 2) for each facial expression, subtracting the average facial expression of the facial expression from each three-dimensional face model sample of the facial expression, thereby obtaining the difference data $G_{exp,j}=\Sigma_{i=1}^{N} S_{exp,i}-\overline{S}$ of the 46 facial expressions, where $G_{exp,j}$ denotes difference data corresponding to a f h type of facial expression, N denotes the number of three-dimensional face model samples of each facial expression (e.g., 400), $\overline{S}$ denotes the average facial expression, and $S_{exp,i}$ denotes an $i^{th}$ three-dimensional face model sample.

After various facial expression bases X corresponding to the three-dimensional average face model are obtained, the three-dimensional average face model M can be added to the facial expression bases X to obtain a three-dimensional average face model of various facial expressions: $S[i]=M+X[i]$ (i=0, 1, 2, . . . , n). It should be noted that the facial expression base X is the same for each face.

It can be seen from FIG. 6 that, in this embodiment, a facial expression fitting step is added to FIG. 3. After the first three-dimensional face model fitted based on the 49 internal face feature points is obtained, a facial expression fitting is further performed based on the three-dimensional model. Since the two-dimensional face image may be any facial expression, and the three-dimensional model is expressionless, facial expression fitting needs to be performed. In this embodiment, a face shape and facial expression fitting process may include the following steps:

In Step S601, a projection mapping matrix from a three-dimensional average face model to the two-dimensional face image is determined based on internal face feature points of the two-dimensional face image and internal face feature points of the three-dimensional average face model.

In Step S603, a first three-dimensional face model corresponding to the two-dimensional face image is constructed based on the projection mapping matrix and feature vectors of a three-dimensional feature face space.

In Step S605, contour feature point fitting is performed on the first three-dimensional face model based on face contour feature points of the two-dimensional face image.

In Step S607, facial expression fitting on the three-dimensional face model fitted with contour feature points is performed based on the internal face feature points of the two-dimensional face image and at least one facial expression base corresponding to the three-dimensional average face model.

The 46 facial expression bases have been obtained in the previous step. In this step, a fitted facial expression coefficient of the facial expression base can be solved by using quadratic programming or a non-negative minimum algorithm. Then a three-dimensional face model fitted with facial expressions can be obtained, and its mathematical expression is as follows:

$$S_{exp\_model} = S_{model} + G*a,$$

$$\mathrm{argmin}\left\{\left(G^R - \sum_{i=0}^{n} a_i G_i^R\right)^T \left(G^R - \sum_{i=0}^{n} a_i G_i^R\right)\right\},$$

where $$\sum_{i=0}^{n} a_i = 1, a_i \geq 0 (i = 0, 1, 2 \ldots, n),$$

$S_{model}$ denotes the three-dimensional face model fitted with contour feature points, $S_{exp\_model}$ denotes the three-dimensional face model fitted with a facial expression, G denotes the facial expression base, and a represents the fitted facial expression coefficient.

Figure 8:
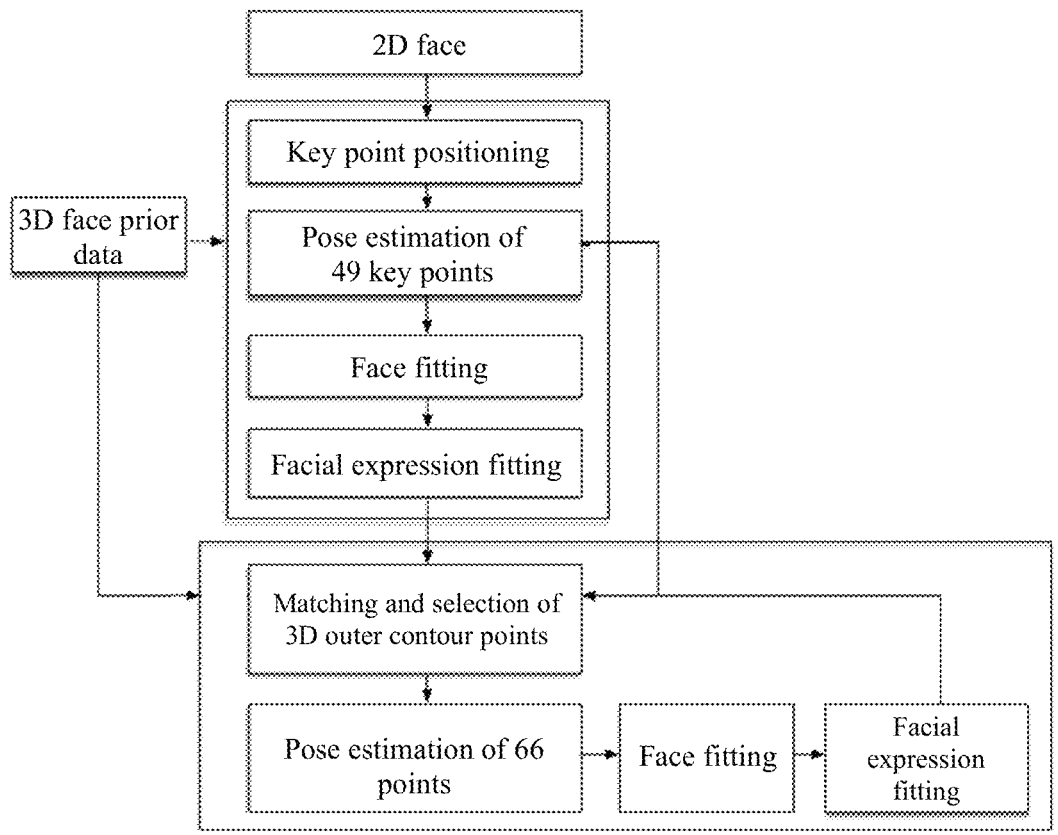
FIG. 8 illustrates an exemplary flowchart of a face shape and expression fitting of the face pose estimation method, in accordance with an embodiment of the disclosure.

FIG. 8 illustrates an exemplary flowchart of a face shape and expression fitting of the face pose estimation method, in accordance with an embodiment of the disclosure. It can be seen from FIG. 8 that in this embodiment, a facial expression fitting step is added to FIG. 5. After the first three-dimensional face model fitted based on the 49 internal face feature points is obtained, facial expression fitting is further performed based on the three-dimensional model. Since the two-dimensional face image can be any facial expression, and the three-dimensional model is expressionless, facial expression fitting needs to be performed.

In Step S609, the three-dimensional face model fitted with the facial expression is used as the three-dimensional face model if an error between the two-dimensional face image and the three-dimensional face model fitted with the facial expression is less than a preset error.

In one example, the method further includes the following step: constructing the three-dimensional face model corresponding to the two-dimensional face image based on the three-dimensional face model fitted with the facial expression if the error is greater than or equal to the preset error.

That is, the above steps S601 to step S609 are performed based on the three-dimensional face model fitted with the facial expression. The three-dimensional average face model in these steps is replaced with the three-dimensional face model fitted with the facial expression that is built last time, each time a new three-dimensional face model is formed. After iterating of the foregoing process for many times and when the error is less than the preset error, the iterations are stopped, and a three-dimensional face model of the two-dimensional face image is reconstructed.

It can be seen from the foregoing embodiment that the face pose estimation method disclosed in this application obtains a two-dimensional face image for processing, constructs a three-dimensional face model corresponding to the two-dimensional face image, and determines a face pose of the two-dimensional face image based on the face feature points of the three-dimensional face model and the face feature points of the two-dimensional face image. With this approach, the face pose estimation is performed based on the three-dimensional face model corresponding to the two-dimensional face image, instead of only based on a three-dimensional average face model. As a result, a high accuracy pose estimation can be obtained even for a face with large-angle and exaggerated facial expressions. Thus, robustness of the pose estimation can be effectively improved.

Second Embodiment

In the foregoing embodiment, a face pose estimation method is disclosed. Correspondingly, a face pose estimation apparatus is further disclosed in this application. The apparatus corresponds to the embodiment of the foregoing method.

Figure 9:
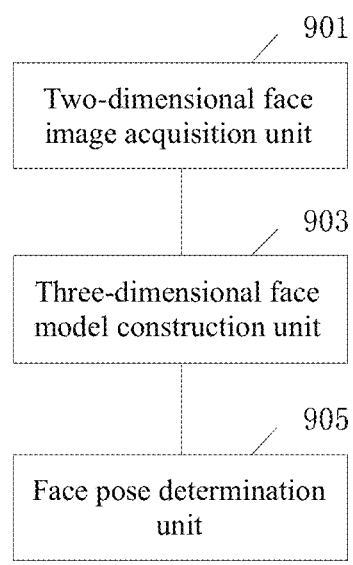
FIG. 9 illustrates a schematic diagram of a face pose estimation apparatus, in accordance with an embodiment of the disclosure.

FIG. 9 illustrates a schematic diagram of a face pose estimation apparatus, in accordance with an embodiment of the disclosure. Since the apparatus embodiment is basically similar to the method embodiment, the description is relatively simple. For a relevant part, reference may be made to the description in the method embodiment. The apparatus embodiment described below is merely illustrative.

This application further discloses a face pose estimation apparatus, comprising: a two-dimensional face image acquisition unit 901, configured to acquire a two-dimensional face image for processing; a three-dimensional face model construction unit 903, configured to construct a three-dimensional face model corresponding to the two-dimensional face image; and a face pose determination unit 905, configured to determine a face pose of the two-dimensional face image based on face feature points of the three-dimensional face model and face feature points of the two-dimensional face image.

The three-dimensional face model construction unit 903 is specifically configured to construct a three-dimensional face model corresponding to the two-dimensional face image by using a face shape fitting algorithm.

The three-dimensional face model construction unit 903 comprises: a projection matrix determination subunit 9031, configured to determine a projection mapping matrix from a three-dimensional average face model to the two-dimensional face image based on internal face feature points of the two-dimensional face image and internal face feature points of the three-dimensional average face model; a first model construction subunit 9033, configured to construct a first three-dimensional face model corresponding to the two-dimensional face image based on the projection mapping matrix and feature vectors of a three-dimensional feature face space; a contour fitting subunit 9035, configured to perform contour feature point fitting on the first three-dimensional model based on face contour feature points of the two-dimensional face image; and a second model determination subunit 9037, configured to use the first three-dimensional face model fitted with the face contour feature points as the three-dimensional face model if an error between the two-dimensional face image and the three-dimensional face model fitted with the face contour feature points is less than a preset error.

The three-dimensional face model construction unit 903 further comprises: a third model construction subunit configured to construct the three-dimensional face model corresponding to the two-dimensional face image based on the three-dimensional face model fitted with the face contour feature points if the error is greater than or equal to the preset error.

The three-dimensional face model construction unit 903 is specifically configured to construct the three-dimensional face model corresponding to the two-dimensional face image by using a facial expression fitting algorithm.

The three-dimensional face model construction unit 903 is specifically configured to construct the three-dimensional face model corresponding to the two-dimensional face image by using a face shape and facial expression fitting algorithm.

Figure 10:
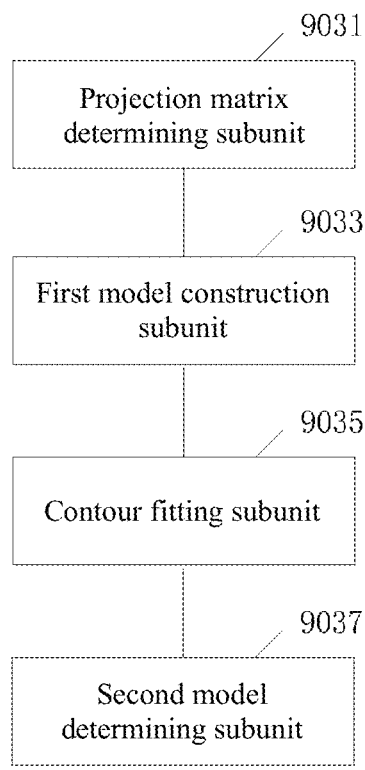
FIG. 10 illustrates an exemplary schematic diagram of the face pose estimation apparatus, in accordance with an embodiment of the disclosure.

Referring to FIG. 10, the three-dimensional face model construction unit 903 comprises: a projection matrix determination subunit, configured to determine a projection mapping matrix from a three-dimensional average face model to the two-dimensional face image based on internal face feature points of the two-dimensional face image and internal face feature points of the three-dimensional average face model; a first model construction subunit, configured to construct a first three-dimensional face model corresponding to the two-dimensional face image based on the projection mapping matrix and feature vectors of a three-dimensional feature face space; a contour fitting subunit, configured to perform contour feature point fitting on the first three-dimensional model based on face contour feature points of the two-dimensional face image; a facial expression fitting subunit, configured to perform facial expression fitting on the first three-dimensional face model fitted with the contour feature points based on the internal face feature points of the two-dimensional face image and at least one facial expression base corresponding to the three-dimensional average face model; and a second model determination subunit configured to use a three-dimensional face model fitted with the facial expressions as the three-dimensional face model if an error between the two-dimensional face image and the three-dimensional face model fitted with the facial expressions is less than a preset error.

The apparatus further comprises: a third model construction subunit configured to construct the three-dimensional face model corresponding to the two-dimensional face image based on the three-dimensional face model fitted with the facial expressions if the error is greater than or equal to the preset error.

The contour fitting subunit comprises: a first contour feature point selection subunit, configured to select, from the first three-dimensional face model, three-dimensional points corresponding to the face contour feature points of the two-dimensional face image as initial three-dimensional contour feature points; a contour feature point mapping subunit, configured to map the initial three-dimensional contour feature points to the two-dimensional face image by using the projection mapping matrix; and a second contour feature point selection subunit, configured to select, by using a nearest neighbor matching algorithm, three-dimensional points corresponding to two-dimensional contour feature points obtained by the mapping as face contour feature points of the first three-dimensional face model.

The apparatus further comprises a first prior data determination unit configured to determine the three-dimensional average face model and the feature vectors based on three-dimensional face model samples.

The apparatus further comprises: a second prior data determination unit configured to determine at least one facial expression base corresponding to the three-dimensional average face model based on three-dimensional face model samples.

Third Embodiment

Figure 11:
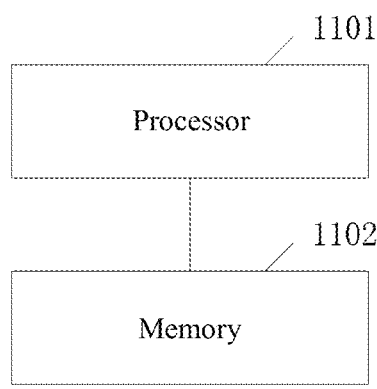
FIG. 11 illustrates a schematic diagram of an electronic device, in accordance with an embodiment of the disclosure.

FIG. 11 illustrates a schematic diagram of an electronic device, in accordance with an embodiment of the disclosure. Since the device embodiment is basically similar to the method embodiment, the description below is relatively simple. For a relevant part, reference may be made to the description in the method embodiment. The device embodiment described below is merely illustrative.

An electronic device is disclosed in this embodiment. The electronic device comprises: a processor 1101 and a memory 1102. The memory is configured to store a program for implementing a face pose estimation method. The device, after being powered on and running the program of the face pose estimation method through the processor, performs the following steps: acquiring a two-dimensional face image for processing; constructing a three-dimensional face model corresponding to the two-dimensional face image; and determining a face pose of the two-dimensional face image based on face feature points of the three-dimensional face model and face feature points of the two-dimensional face image.

Fourth Embodiment

Corresponding to the foregoing face pose estimation method, a three-dimensional face reconstruction method is further disclosed in this application. An executor of the method includes a three-dimensional face reconstruction apparatus.

Figure 12:
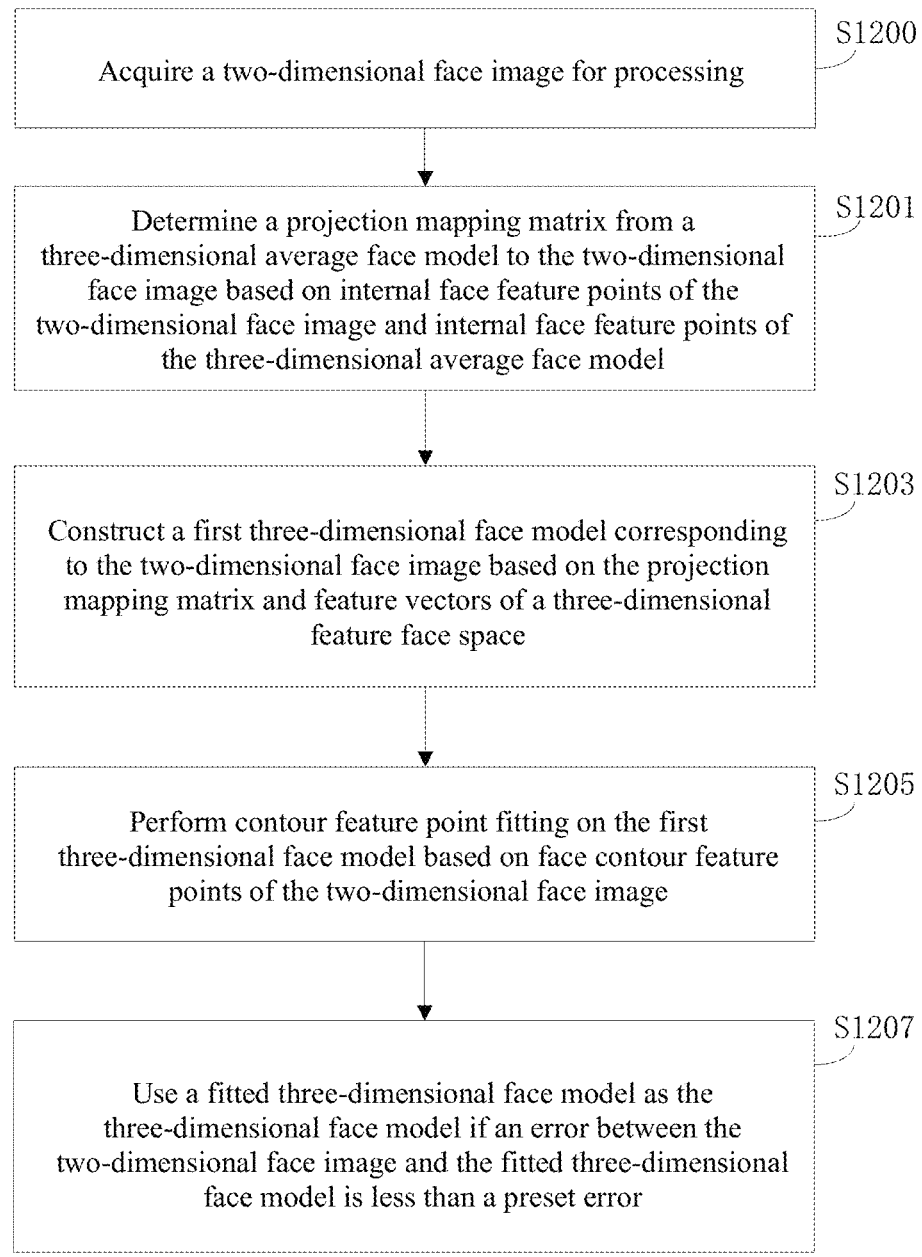
FIG. 12 illustrates a flowchart of a three-dimensional face reconstruction method, in accordance with an embodiment of the disclosure.

FIG. 12 illustrates a flowchart of a three-dimensional face reconstruction method, in accordance with an embodiment of the disclosure. The parts in this embodiment having the same content as the first embodiment will not be repeated herein. Reference can be made to a corresponding part in the first embodiment.

In Step S1200, a two-dimensional face image is acquired for processing.

In Step S1201, a projection mapping matrix from a three-dimensional average face model to the two-dimensional face image is determined based on internal face feature points of the two-dimensional face image and internal face feature points of the three-dimensional average face model.

In Step S1203, a first three-dimensional face model corresponding to the two-dimensional face image is constructed based on the projection mapping matrix and feature vectors of a three-dimensional feature face space.

In Step S1205, a contour feature point fitting on the first three-dimensional face model is performed based on face contour feature points of the two-dimensional face image.

In Step S1207, the fitted first three-dimensional face model is used as a three-dimensional face model of the two-dimensional face image if an error between the two-dimensional face image and the fitted first three-dimensional face model is less than a preset error.

Figure 13:
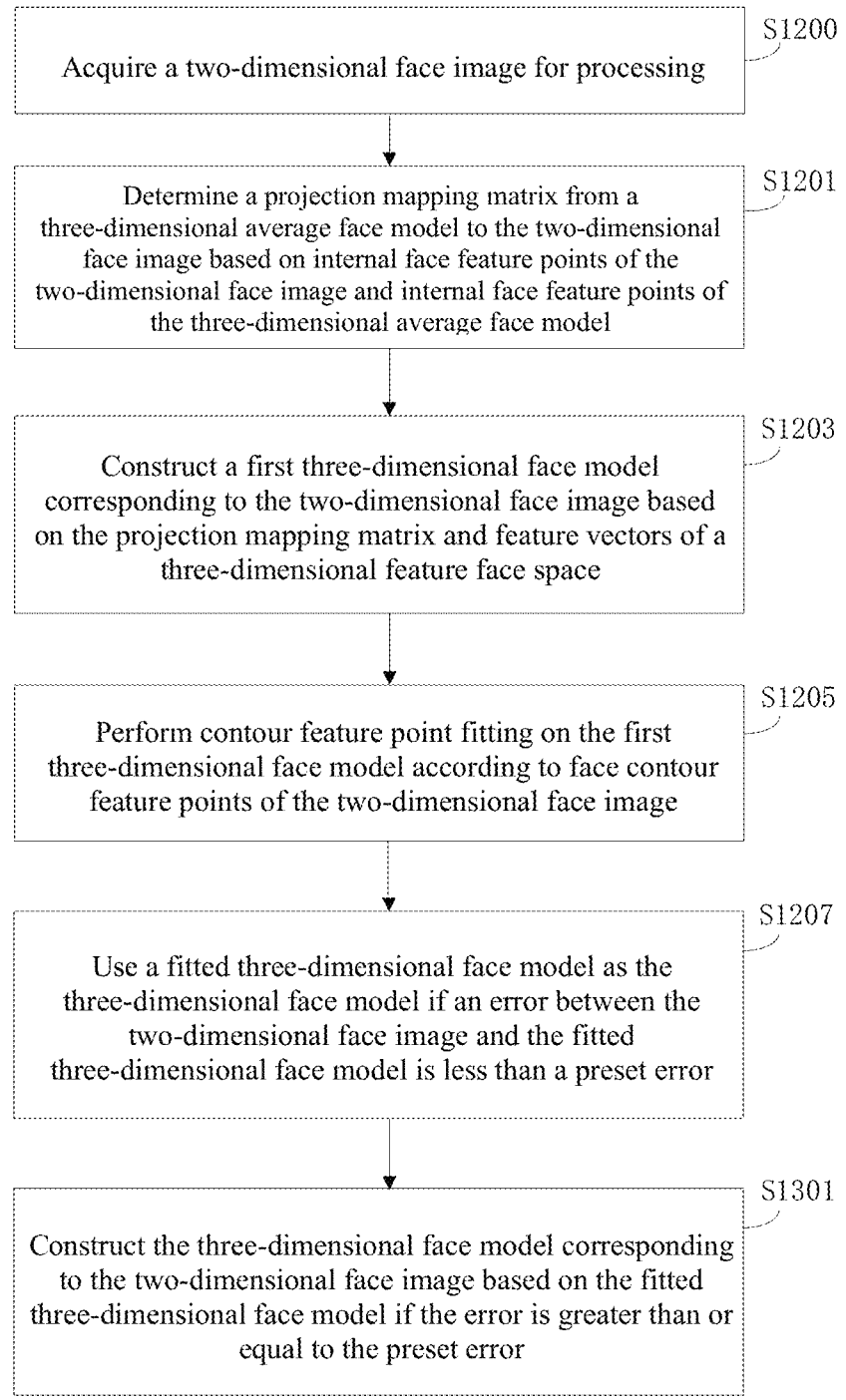
FIG. 13 illustrates an exemplary flowchart of the three-dimensional face reconstruction method, in accordance with an embodiment of the disclosure.

Referring to FIG. 13, the method may further include Step S1301. In Step S1301, the three-dimensional face model corresponding to the two-dimensional face image is constructed based on the fitted three-dimensional face model if the error is greater than or equal to the preset error.

Figure 14:
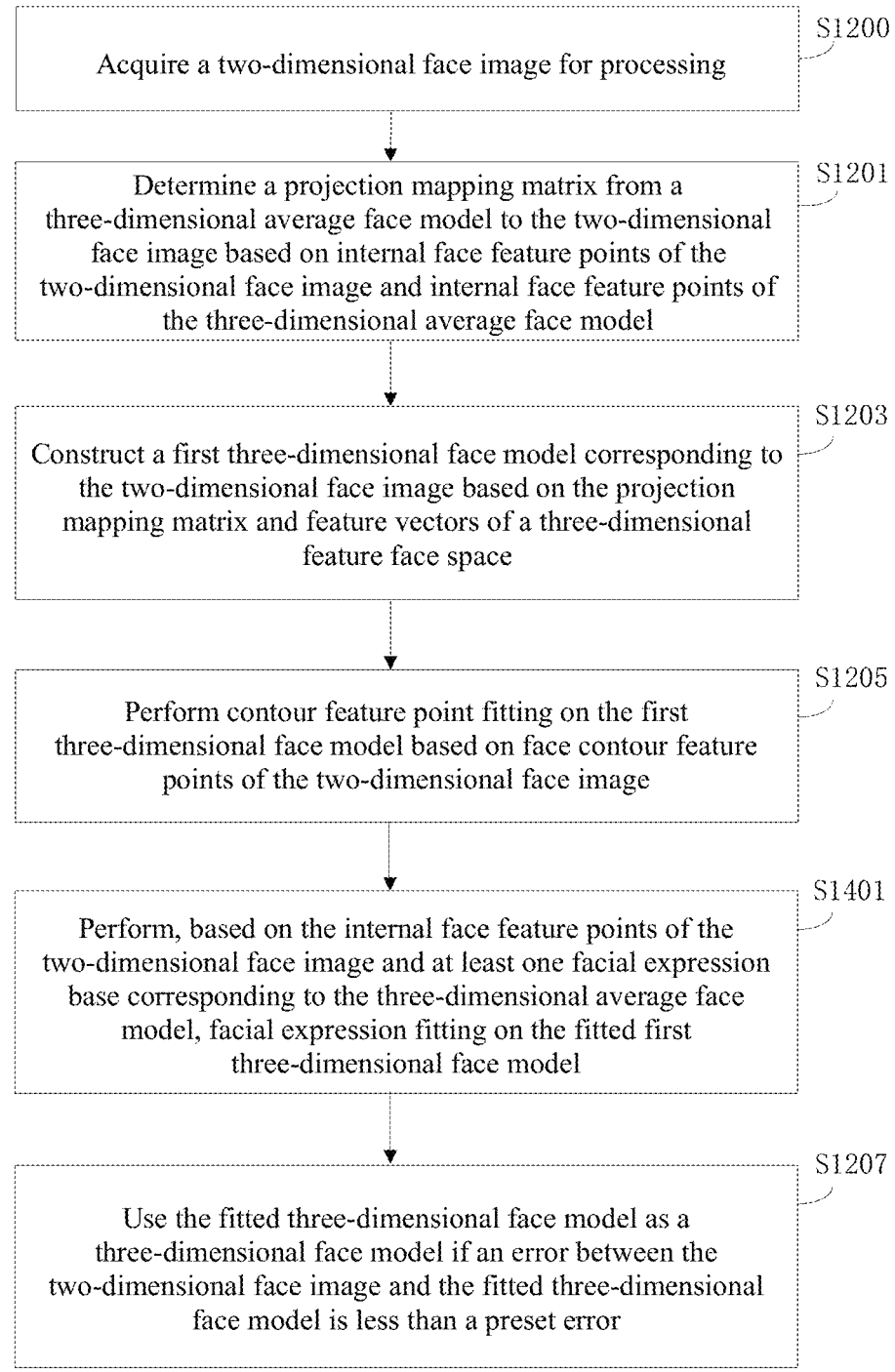
FIG. 14 illustrates another exemplary flowchart of the three-dimensional face reconstruction method, in accordance with an embodiment of the disclosure.

Referring to FIG. 14, after performing the contour feature point fitting on the first three-dimensional face model based on the face contour feature points of the two-dimensional face image, the method may further include Step S1401. In Step S1401, a facial expression fitting on a three-dimensional face model fitted with the contour feature points is performed based on the internal face feature points of the two-dimensional face image and at least one facial expression base corresponding to the three-dimensional average face model.

In one example, after the constructing the first three-dimensional face model corresponding to the two-dimensional face image based on the projection mapping matrix and feature vectors of a three-dimensional feature face space, the method may further include the following step: performing facial expression fitting on the first three-dimensional face model based on at least one facial expression base corresponding to the three-dimensional average face model. Correspondingly, step S1205 may be implemented in the following manner: performing contour feature point fitting on the first three-dimensional face model fitted with a facial expression based on the face contour feature points of the two-dimensional face image.

In one example, the performing the contour feature point fitting on the first three-dimensional model fitted with a facial expression based on the face contour feature points of the two-dimensional face image may include the following sub-steps: 1) selecting three-dimensional points corresponding to the face contour feature points of the two-dimensional face image from the first three-dimensional face model as initial three-dimensional contour feature points; 2) mapping the initial three-dimensional contour feature points to the two-dimensional face image by using the projection mapping matrix; 3) selecting, by using a nearest neighbor matching algorithm, three-dimensional points corresponding to two-dimensional contour feature points obtained by the mapping as face contour feature points of the first three-dimensional face model.

In an example, the method may further include the following step: determining the three-dimensional average face model and the feature vectors based on the three-dimensional face model samples.

In one example, the method may further include the following step: determining the at least one facial expression base corresponding to the three-dimensional average face model based on the three-dimensional face model samples.

It can be seen from the foregoing embodiment that the face pose estimation method disclosed in this application obtains a two-dimensional face image for processing, constructs a three-dimensional face model corresponding to the two-dimensional face image, and determines a face pose of the two-dimensional face image based on the face feature points of the three-dimensional face model and the face feature points of the two-dimensional face image. With this approach, the face pose estimation is performed based on the three-dimensional face model corresponding to the two-dimensional face image, instead of only based on a three-dimensional average face model. As a result, a high accuracy pose estimation can be obtained even for a face with large-angle and exaggerated facial expressions. Thus, robustness of the pose estimation can be effectively improved.

It can be seen from the foregoing embodiment that, the three-dimensional face reconstruction method disclosed in this application obtains a two-dimensional face image for processing, determines a projection mapping matrix from a three-dimensional average face model to the two-dimensional face image based on internal face feature points of the two-dimensional face image and internal face feature points of the three-dimensional average face model, constructs a first three-dimensional face model corresponding to the two-dimensional face image based on the projection mapping matrix and feature vectors of a three-dimensional feature face space, performs contour feature point fitting on the first three-dimensional face model based on face contour feature points of the two-dimensional face image, and uses the fitted first three-dimensional face model as a three-dimensional face model of the two-dimensional face image if an error between the two-dimensional face image and the first fitted three-dimensional face model is less than a preset error. With this approach, the three-dimensional face model fitting is driven based on three-dimensional face prior data, and a combination of internal face feature points and outer contour face feature points is taken into consideration. Further, fitting iterations are performed to minimize an error between a three-dimensional face model and a two-dimensional face image, and a real face is restored to the greatest extent. Moreover, the reconstructed three-dimensional face model conforms to biological characteristics of the face. Thus, reconstruction accuracy of the three-dimensional face model can be effectively improved.

Fifth Embodiment

In the foregoing embodiment, a three-dimensional face reconstruction method is disclosed. Correspondingly, a three-dimensional face reconstruction apparatus is further disclosed in this application. The apparatus corresponds to the embodiment of the foregoing method.

Figure 15:
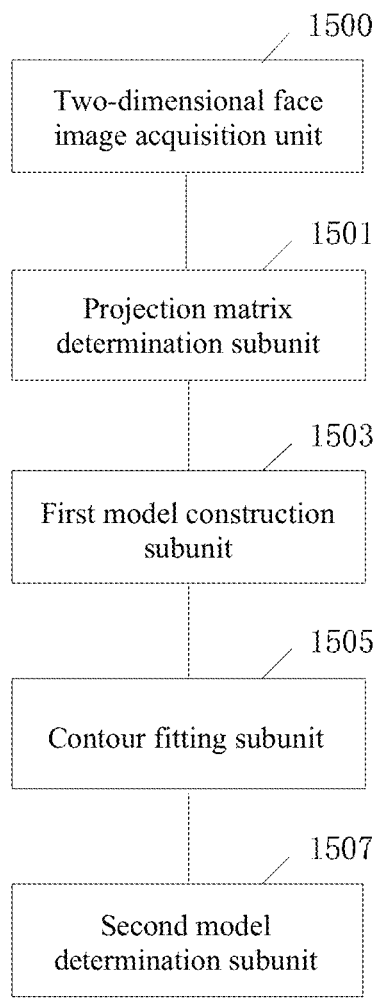
FIG. 15 illustrates a schematic diagram of a three-dimensional face reconstruction apparatus, in accordance with an embodiment of the disclosure.

FIG. 15 illustrates a schematic diagram of a three-dimensional face reconstruction apparatus, in accordance with an embodiment of the disclosure. Since the apparatus embodiment is basically similar to the method embodiment, the description below is relatively simple. For a relevant part, reference may be made to the description in the method embodiment. The apparatus embodiment described below is merely illustrative.

This application further discloses a three-dimensional face reconstruction apparatus comprising: a two-dimensional face image acquisition unit 1500, configured to acquire a two-dimensional face image for processing; a projection matrix determination subunit 1501, configured to determine a projection mapping matrix from a three-dimensional average face model to the two-dimensional face image based on internal face feature points of the two-dimensional face image and internal face feature points of the three-dimensional average face model; a first model construction subunit 1503, configured to construct a first three-dimensional face model corresponding to the two-dimensional face image based on the projection mapping matrix and feature vectors of a three-dimensional feature face space; a contour fitting subunit 1505, configured to perform contour feature point fitting on the first three-dimensional face model based on face contour feature points of the two-dimensional face image; and a second model determination unit 1507, configured to use the fitted first three-dimensional face model as a three-dimensional face model of the two-dimensional face image if an error between the two-dimensional face image and the fitted three-dimensional face model is less than a preset error.

The apparatus further comprises a first facial expression fitting unit configured to perform facial expression fitting on a three-dimensional face model fitted with the contour feature points based on internal face feature points of the two-dimensional face image and at least one facial expression base corresponding to the three-dimensional average face model.

The apparatus further comprises a second facial expression fitting unit configured to perform facial expression fitting on the first three-dimensional face model based on at least one facial expression base corresponding to the three-dimensional average face model.

The contour fitting subunit is specifically configured to perform contour feature point fitting on the first three-dimensional face model fitted with the facial expression based on the face contour feature points of the two-dimensional face image.

The contour fitting subunit 1505 comprises: a first contour feature point selection subunit, configured to select, from the first three-dimensional face model, three-dimensional points corresponding to the face contour feature points of the two-dimensional face image as initial three-dimensional contour feature points; a contour feature point mapping subunit, configured to map the initial three-dimensional contour feature points to the two-dimensional face image by using the projection mapping matrix; and a second contour feature point selection subunit, configured to select, by using a nearest neighbor matching algorithm, three-dimensional points corresponding to two-dimensional contour feature points obtained by the mapping as face contour feature points of the first three-dimensional face model.

The apparatus further comprises: a third model construction subunit configured to construct the three-dimensional face model corresponding to the two-dimensional face image based on the fitted three-dimensional face model if the error is greater than or equal to the preset error.

The apparatus further comprises: a first prior data determination unit configured to determine the three-dimensional average face model and the feature vectors based on three-dimensional face model samples.

The apparatus further comprises a second prior data determination unit configured to determine at least one facial expression base corresponding to the three-dimensional average face model based on three-dimensional face model samples.

Sixth Embodiment

Figure 16:
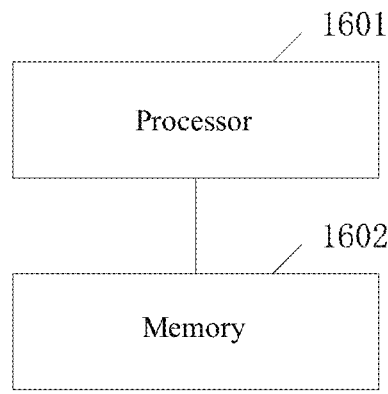
FIG. 16 illustrates a schematic diagram of an electronic device, in accordance with an embodiment of the disclosure.

FIG. 16 illustrates a schematic diagram of an electronic device, in accordance with an embodiment of the disclosure. Since the device embodiment is basically similar to the method embodiment, the description below is relatively simple. For a relevant part, reference may be made to the description in the method embodiment. The device embodiment described below is merely illustrative.

This application discloses an electronic device comprising: a processor 1601 and a memory 1602. The memory is configured to store a program for performing a three-dimensional face reconstruction method. The device, after being powered on and running the program of the three-dimensional face reconstruction method through the processor, performs the following steps: acquiring a two-dimensional face image for processing; determining a projection mapping matrix from a three-dimensional average face model to the two-dimensional face image based on internal face feature points of the two-dimensional face image and internal face feature points of the three-dimensional average face model; constructing a first three-dimensional face model corresponding to the two-dimensional face image based on the projection mapping matrix and feature vectors of a three-dimensional feature face space; performing contour feature point fitting on the first three-dimensional face model based on face contour feature points of the two-dimensional face image; and using the fitted first three-dimensional face model as a three-dimensional face model of the two-dimensional face image if an error between the two-dimensional face image and the fitted first three-dimensional face model is less than a preset error.

Although this application discloses the preferred embodiments as above, these embodiments are not intended to limit this application. A person skilled in the art may make possible modifications and improvements without departing from the spirit and scope of this application. Therefore, the protection scope of this application should be subject to the scope defined by appended claims of this application.

In a typical configuration, a computing device includes one or more processors (CPUs), input/output interfaces, network interfaces, and an internal memory.

The internal memory may include a non-persistent memory of computer-readable media, a random-access memory (RAM), and/or a nonvolatile internal memory, or the like, e.g., a read-only memory (ROM) and a flash memory (flash RAM). The internal memory is an example of the computer-readable medium.

The computer-readable medium includes persistent medium and non-persistent, removable and non-removable media, and information storage may be implemented by any method or technology. The information may be computer-readable instructions, data structures, program modules, or other data. Examples of computer storage media include, but are not limited to, phase-change memory (PRAM), static random access memory (SRAM), dynamic random access memory (DRAM), other types of random-access memory (RAM), read-only memory (ROM), electrically erasable programmable read-only memory (EEPROM), flash memory or other memory technologies, compact disc read-only memory (CD-ROM), digital versatile disc (DVD) or other optical memory, magnetic cassettes, magnetic tapes, magnetic disk storage or other magnetic storage device, or any other non-transmission media can be used to store information accessible by a computing device. Based on this specification, the computer-readable media does not include non-transitory computer-readable media (transitory media), such as modulated data signals and carriers.

A person skilled in the art should understand that the embodiments of this application may be provided as a method, a system, or a computer program product. Therefore, this application may use a form of hardware-only embodiments, software-only embodiments, or embodiments combining software and hardware. In addition, this application may use a form of a computer program product that is implemented on one or more computer-usable storage media (including but not limited to a disk memory, a CD-ROM, an optical memory, and the like) containing computer-usable program code.

What is claimed is:
1. A face pose estimation method, comprising:
    acquiring a two-dimensional face image;
    constructing a three-dimensional face model corresponding to the two-dimensional face image, wherein the constructing of the three-dimensional face model comprises:

obtaining a plurality of three-dimensional face model samples with a neutral facial expression;

applying a dimensionality reduction algorithm to the plurality of three-dimensional face model samples with the neutral facial expression to determine a three-dimensional average face model;

for each of the plurality of three-dimensional face model samples with the neutral facial expression, generating multiple face model samples corresponding to multiple non-neutral facial expressions, thereby obtaining a plurality of three-dimensional face model samples for each facial expression;

for each facial expression, determining a facial expression base by (1) obtaining an average facial expression model for the facial expression based on the plurality of three-dimensional face model samples for the facial expression; (2) subtracting the average facial expression model for the facial expression from each of the plurality of three-dimensional face model samples to obtain a difference data vector, (3) determining the difference data vector as the facial expression base for the facial expression;

determining a projection mapping matrix from the three-dimensional average face model to the two-dimensional face image based on internal face feature points of the two-dimensional face image and the three-dimensional average face model, wherein the internal face feature points include one or more of eyes, nose tip, mouth corner points, or eyebrows;

constructing a first three-dimensional face model corresponding to the two-dimensional face image based on the projection mapping matrix and feature vectors of a three-dimensional feature face space;

performing contour feature point fitting on the first three-dimensional face model based on face contour feature points of the two-dimensional face image;

after the contour feature point fitting, performing facial expression fitting on the first three-dimensional face model based on the internal face feature points of the two-dimensional face image and at least one of the facial expression bases;

determining an error between the two-dimensional face image and the three-dimensional face model; and in response to the error being less than a preset error, adopting the first three-dimensional face model.

2. The method of claim 1, wherein the constructing the three-dimensional face model corresponding to the two-dimensional face image comprises:

constructing the three-dimensional face model corresponding to the two-dimensional face image by using a face shape fitting algorithm.

3. The method of claim 1, wherein the constructing the three-dimensional face model corresponding to the two-dimensional face image comprises:

constructing the three-dimensional face model corresponding to the two-dimensional face image by using a facial expression fitting algorithm.

4. The method of claim 1, wherein the constructing the three-dimensional face model corresponding to the two-dimensional face image comprises:

constructing the three-dimensional face model corresponding to the two-dimensional face image by using a face shape and expression fitting algorithm.

5. The method of claim 1, further comprising:

in response to the error being greater than or equal to the preset error, constructing the three-dimensional face model corresponding to the two-dimensional face image based on the three-dimensional face model fitted with the facial expression.

6. The method of claim 1, wherein the performing the contour feature point fitting on the first three-dimensional face model based on the face contour feature points of the two-dimensional face image comprises:

selecting, from the first three-dimensional face model, three-dimensional points corresponding to the face contour feature points of the two-dimensional face image as initial three-dimensional contour feature points;

mapping the initial three-dimensional contour feature points to the two-dimensional face image by using the projection mapping matrix; and selecting, by using a nearest neighbor matching algorithm, mapped three-dimensional points corresponding to two-dimensional contour feature points as face contour feature points of the first three-dimensional face model.

7. The method of claim 1, further comprising:

determining at least one facial expression base corresponding to the three-dimensional average face model based on the plurality of three-dimensional face model samples.

8. A three-dimensional face reconstruction method, comprising:

acquiring a two-dimensional face image for processing;

applying a dimensionality reduction algorithm to a plurality of three-dimensional face model samples with a neutral facial expression to determine a three-dimensional average face model with the neutral facial expression;

for each of the plurality of three-dimensional face model samples with the neutral facial expression, generating multiple face model samples corresponding to multiple non-neutral facial expressions, thereby obtaining a plurality of three-dimensional face model samples for each facial expression;

for each facial expression, determining a facial expression base by (1) obtaining an average facial expression model for the facial expression based on the plurality of three-dimensional face model samples for the facial expression; (2) subtracting the average facial expression model for the facial expression from each of the plurality of three-dimensional face model samples to obtain a difference data vector, (3) determining the difference data vector as the facial expression base for the facial expression;

determining a projection mapping matrix from the three-dimensional average face model to the two-dimensional face image based on internal feature points of the two-dimensional face image and the three-dimensional average face model, wherein the internal face feature points include one or more of eyes, nose tip, mouth corner points, or eyebrows;

constructing a first three-dimensional face model corresponding to the two-dimensional face image based on the projection mapping matrix and feature vectors of a three-dimensional feature face space;

performing face contour feature points fitting on the three-dimensional average face model based on the two-dimensional face image;

after the contour feature point fitting, performing facial expression fitting on the first three-dimensional face model based on the internal face feature points of the two-dimensional face image and at least one of the facial expression bases;

determining an error between the two-dimensional face image and the fitted three-dimensional face model; and in response to the error being less than a preset error, adopting the first three-dimensional face model.

9. The method of claim 8, wherein after the constructing the first three-dimensional face model corresponding to the two-dimensional face image based on the projection mapping matrix and the feature vectors of the three-dimensional feature face space, the method further comprises:

performing expression fitting on the first three-dimensional face model based on at least one facial expression base corresponding to the three-dimensional average face model;

wherein the performing the contour feature point fitting on the first three-dimensional face model based on the face contour feature points of the two-dimensional face image comprises:

performing the contour feature point fitting on the first three-dimensional face model fitted with the facial expression based on the face contour feature points of the two-dimensional face image.

10. The method of claim 8, wherein the performing the contour feature point fitting on the first three-dimensional face model based on the face contour feature points of the two-dimensional face image comprises:

selecting, from the first three-dimensional face model, three-dimensional points corresponding to the face contour feature points of the two-dimensional face image as initial three-dimensional contour feature points;

mapping the initial three-dimensional contour feature points to the two-dimensional face image by using the projection mapping matrix; and selecting, by using a nearest neighbor matching algorithm, mapped three-dimensional points corresponding to two-dimensional contour feature points as face contour feature points of the first three-dimensional face model.

11. The method of claim 8, further comprising:

determining at least one facial expression base corresponding to the three-dimensional average face model based on the plurality of three-dimensional face model samples.

12. An electronic device, comprising:

a processor; and a memory, configured to store a program for implementing a face pose estimation method, wherein the device, after being powered on and running the program of the face pose estimation method through the processor, performs the following steps:

acquiring a two-dimensional face image;

constructing a three-dimensional face model corresponding to the two-dimensional face image, wherein the constructing of the three-dimensional face model comprises:

obtaining a plurality of three-dimensional face model samples with a neutral facial expression;

applying a dimensionality reduction algorithm to the plurality of three-dimensional face model samples with the neutral facial expression to determine a three-dimensional average face model;

for each of the plurality of three-dimensional face model samples with the neutral facial expression, generating multiple face model samples corresponding to multiple non-neutral facial expressions, thereby obtaining a plurality of three-dimensional face model samples for each facial expression;

for each facial expression, determining a facial expression base by (1) obtaining an average facial expression model for the facial expression based on the plurality of three-dimensional face model samples for the facial expression; (2) subtracting the average facial expression model for the facial expression from each of the plurality of three-dimensional face model samples to obtain a difference data vector, (3) determining the difference data vector as the facial expression base for the facial expression;

determining a projection mapping matrix from the three-dimensional average face model to the two-dimensional face image based on internal face feature points of the two-dimensional face image and the three-dimensional average face model, wherein the internal face feature points include one or more of eyes, nose tip, mouth corner points, or eyebrows;

constructing a first three-dimensional face model corresponding to the two-dimensional face image based on the projection mapping matrix and feature vectors of a three-dimensional feature face space;

performing contour feature point fitting on the first three-dimensional face model based on face contour feature points of the two-dimensional face image;

after the contour feature point fitting, performing facial expression fitting on the first three-dimensional face model based on the internal face feature points of the two-dimensional face image and at least one of the facial expression bases;

determining an error between the two-dimensional face image and the three-dimensional face model; and in response to the error being less than a preset error, adopting the first three-dimensional face model.

13. The electronic device of claim 12, wherein the constructing the three-dimensional face model corresponding to the two-dimensional face image comprises:

constructing the three-dimensional face model corresponding to the two-dimensional face image by using a face shape fitting algorithm.

\* \* \* \* \*